US011107200B2

(12) United States Patent
Jones et al.

(10) Patent No.: US 11,107,200 B2
(45) Date of Patent: Aug. 31, 2021

(54) METHODS AND DEVICES FOR OPTICAL ABERRATION CORRECTION

(71) Applicant: ESIGHT CORP., Kanata (CA)

(72) Inventors: Frank Jones, Carp (CA); Mehdi Arezoomand Ershadi, Ottawa (CA); James Benson Bacque, Ottawa (CA)

(73) Assignee: eSight Corp., Kanata (CA)

( * ) Notice: Subject to any disclaimer, the term of this patent is extended or adjusted under 35 U.S.C. 154(b) by 0 days.

(21) Appl. No.: 16/949,060

(22) Filed: Oct. 12, 2020

(65) Prior Publication Data

US 2021/0125314 A1 Apr. 29, 2021

Related U.S. Application Data

(63) Continuation of application No. 16/665,239, filed on Oct. 28, 2019, now Pat. No. 10,803,560, which is a (Continued)

(51) Int. Cl.
*G06T 5/00* (2006.01)
*G02B 13/00* (2006.01)
(Continued)

(52) U.S. Cl.
CPC ............ *G06T 5/006* (2013.01); *G02B 13/007* (2013.01); *G02B 17/086* (2013.01); *G02B 27/017* (2013.01); *G02B 27/0172* (2013.01); *G06T 3/0093* (2013.01); *G06T 15/04* (2013.01); *G06T 15/20* (2013.01); *G09G 3/20* (2013.01); *G02B 2027/011* (2013.01); *G02B 2027/014* (2013.01); *G02B 2027/0116* (2013.01); *G02B 2027/0178* (2013.01); *G02C 7/086* (2013.01); *G02C 2202/10* (2013.01); *G02C 2202/22* (2013.01); *G06T 2215/16* (2013.01); *G09G 2320/0666* (2013.01)

(58) Field of Classification Search
CPC ....................................................... G06T 5/006
See application file for complete search history.

(56) References Cited

U.S. PATENT DOCUMENTS

2014/0340390 A1* 11/2014 Lanman .............. H04N 13/344
 345/419
2016/0091720 A1* 3/2016 Stafford ............. G02B 27/0093
 345/8

* cited by examiner

*Primary Examiner* — Shivang I Patel
(74) *Attorney, Agent, or Firm* — Rosenberg, Klein & Lee

(57) ABSTRACT

Near-to-eye displays within head mounted devices offer both users with and without visual impairments enhanced visual experiences either by improving or augmenting their visual perception. Unless the user directly views the display without intermediate optical elements then the designer must consider chromatic as well as other aberrations. Within the prior art the optical train is either complex through additional corrective elements adding to weight, cost, and size or through image processing. However, real time applications with mobile users require low latency to avoid physical side effects. Accordingly, it would be beneficial to provide near-to-eye displays mitigating these distortions and chromatic aberrations through pre-distortion based electronic processing techniques in conjunction with design optimization of the optical train with low weight, low volume, low complexity, and low cost. Further, it would be beneficial to exploit consumer grade low cost graphics processing units rather than application specific circuits.

22 Claims, 27 Drawing Sheets

Related U.S. Application Data continuation of application No. 15/799,075, filed on Oct. 31, 2017, now Pat. No. 10,460,426, which is a continuation of application No. 15/135,805, filed on Apr. 22, 2016, now Pat. No. 9,836,828.

(60) Provisional application No. 62/150,911, filed on Apr. 22, 2015.

(51) Int. Cl.
*G02B 27/01* (2006.01)
*G06T 3/00* (2006.01)
*G06T 15/04* (2011.01)
*G06T 15/20* (2011.01)
*G09G 3/20* (2006.01)
*G02B 17/08* (2006.01)
*G02C 7/08* (2006.01)

| | % of 36° Field | MTF10 (lines/mm) | MTF10 (arcmin) |
|---|---|---|---|
| 610 | 75-100% (±13.5-±18°) | >38.5 | <2.3 |
| 620 | 50-75% (±9-±13.5°) | >42 | <2.1 |
| 630 | 25-50% (±4.5-±9°) | >46.5 | <1.9 |
| 640 | 0-25% (±4.5°) | 50+ | 1.75 |

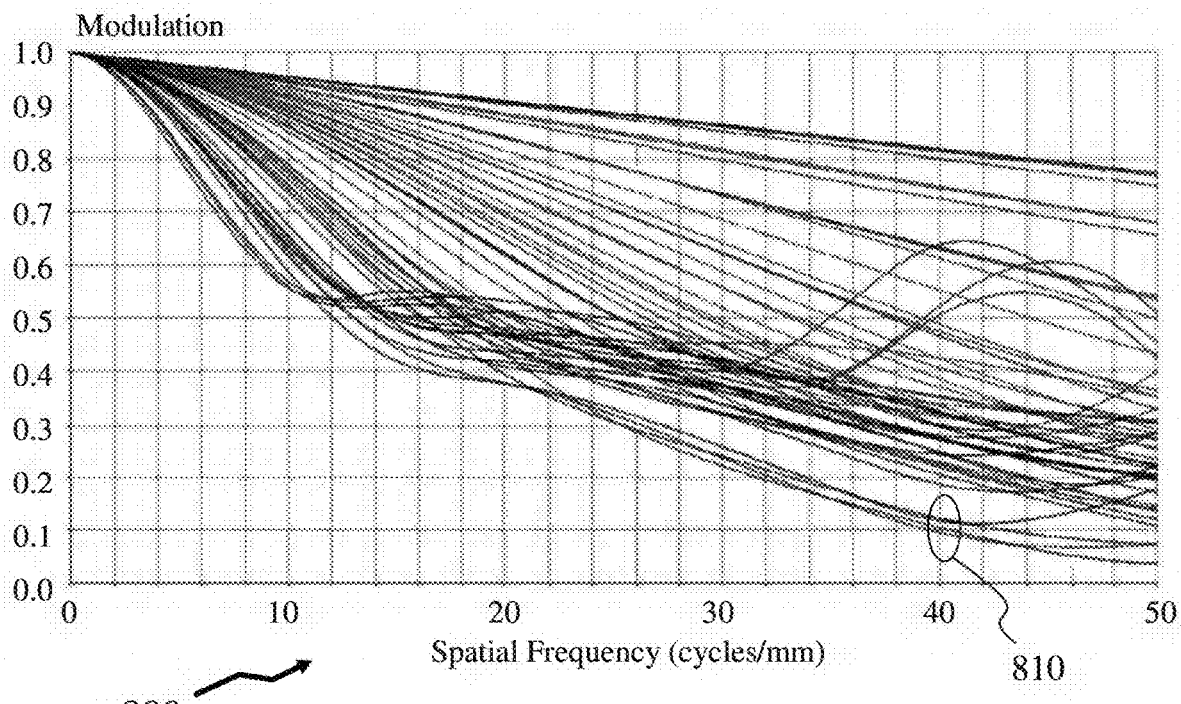
FIG. 8
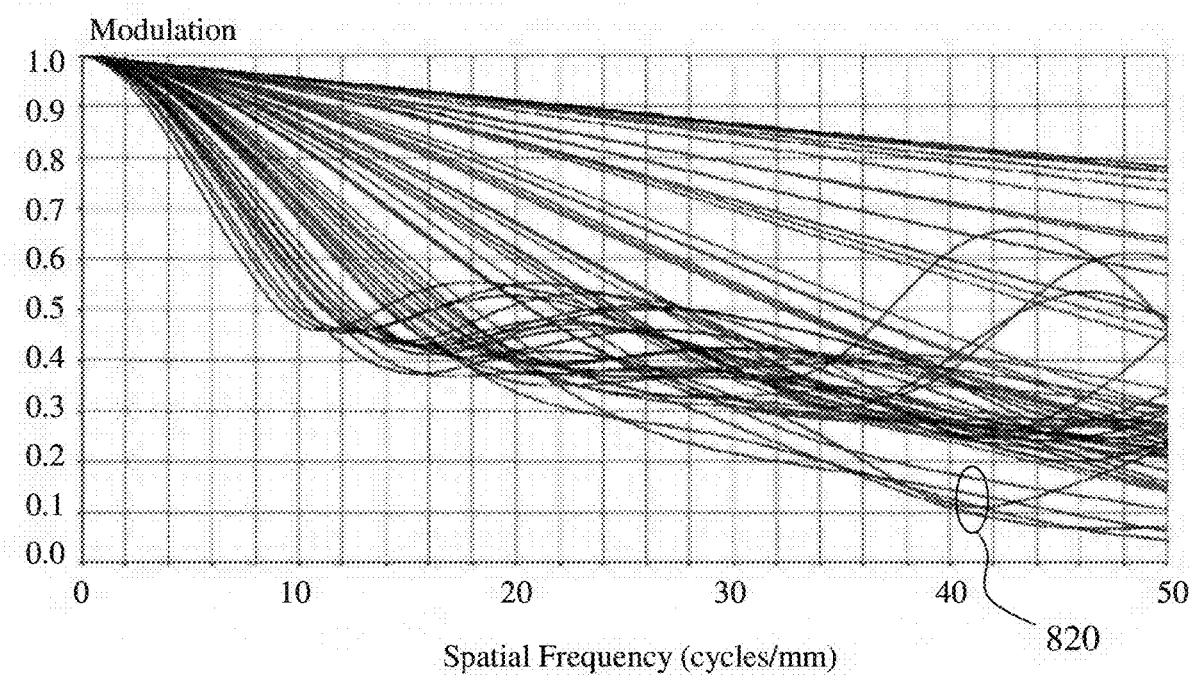

METHODS AND DEVICES FOR OPTICAL ABERRATION CORRECTION

CROSS-REFERENCE TO RELATED APPLICATIONS

This patent application claims the benefit of priority as a continuation of U.S. patent application Ser. No. 15/799,075 filed Oct. 31, 2017 entitled "Methods and Devices for Optical Aberration Correction", which itself claims the benefit of priority as a continuation of U.S. patent application Ser. No. 15/135,805 filed Apr. 22, 2016 entitled "Methods and Devices for Optical Aberration Correction" which itself claims the benefit of priority from U.S. Provisional Patent Application 62/150,911 filed Apr. 22, 2015 entitled "Methods and Devices for Optical Aberration Correction", the entire contents of which are incorporated herein by reference.

FIELD OF THE INVENTION

This invention relates to near-to-eye systems and more particularly to methods and devices for addressing optical aberrations within such near-to-eye systems and near-to-eye vision augmentation systems.

BACKGROUND OF THE INVENTION

A near-to-eye (or near-eye) display is a wearable device that creates a display in front of the user's field of vision. The display may be transparent or opaque, depending on the application. For example, a transparent display can overlay information and graphics on top on the real world, while an opaque display can provide an immersive theater-like experience.

Near-to-eye Displays can be broadly placed in two categories, immersive and see-through. Immersive near-to-eye displays block a user's view of the real world and create a large field of view image, typically 30°-60° degrees for cinema glasses and 90° + degrees for virtual reality displays. See-through near-to-eye displays leave the user's view of the real world open and create either a transparent image or a very small opaque image that blocks only a small portion of the user's peripheral vision. The see-through category can be broken down into two applications, augmented reality and smart glasses. Augmented reality headsets typically offer 20°-60° degree fields of view and overlay information and graphics on top of the user's view of the real world. Smart glasses, which are really a misnomer, in contrast typically have a smaller field of view and a display at which the user glances periodically rather than looking through the display continuously.

However, such near-to-eye displays employ a number of optical elements including the displays, intermediate lens and prisms, and the user's pupils even without consideration of whether they use prescription refractive correction lenses. As such the optical train from display to pupil within near-to-eye displays introduces distortions and chromatic aberrations into the projected image. Where these near-to-eye displays are projecting real time video data captured by a camera then the distortions and chromatic aberrations of these must be considered as well. In many instances the correction of these distortions and chromatic aberrations requires either the design of the optical train to become significantly more complex through additional corrective elements adding to weight, cost, and size; require complex image processing thereby adding to latency from image acquisition to presentation which has severe impacts after a relatively low latency threshold is exceeded thereby requiring faster electronics with increased cost and power consumption; or a tradeoff in the performance of the near-to-eye display must be made.

Accordingly, it would be beneficial therefore to provide designs of such near-to-eye displays with methods of mitigating these distortions and chromatic aberrations through electronic processing techniques in addition to potential modifications to some optical elements such that low weight, low volume, low complexity, and low cost near-to-eye display systems can be provided to users, both with normal vision or with low-vision. It would be further beneficial to also provide for chromatic distortion correction within the context of exploiting consumer grade higher performance, low cost graphics processing units.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to near-to-eye systems and more particularly to methods and devices for addressing optical aberrations within such near-to-eye systems and near-to-eye vision augmentation systems.

In accordance with an embodiment of the invention there is provided a method comprising:
receiving image data for presentation to a user on a near-to-eye (N2I) display wherein an optical train is disposed between the user's eye and the N2I display;
processing the received image data in dependence upon a static vertex buffer with an image processing pipeline;
storing the processed output from the image processing pipeline within a frame buffer; and displaying the processed output to the user on the N2I display.

In accordance with an embodiment of the invention there are provided computer executable code for execution by a microprocessor stored upon a non-volatile, non-transient memory, the computer executable code comprising instructions relating to a method comprising the steps:
receiving image data for presentation to a user on a near-to-eye (N2I) display wherein an optical train is disposed between the user's eye and the N2I display;
processing the received image data in dependence upon a static vertex buffer with an image processing pipeline;
storing the processed output from the image processing pipeline within a frame buffer; and displaying the processed output to the user on the N2I display.

In accordance with an embodiment of the invention there is provided a near-to-eye display system comprising:
a micro-display; and
a free-form prism for coupling the output of the micro-display to a user's eye, wherein
the pixel-colour-values sent to the micro-display for display have been digitally pre-distorted from the original digital image in order to compensate for at least one of chief-ray-angle, sensor non-linearity within an image sensor capturing the original digital image, and prism-induced distortions.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 8 depicts diffraction limited optical modulation transfer function for an early and later iteration of the lens design;

DETAILED DESCRIPTION

Figure 1A:
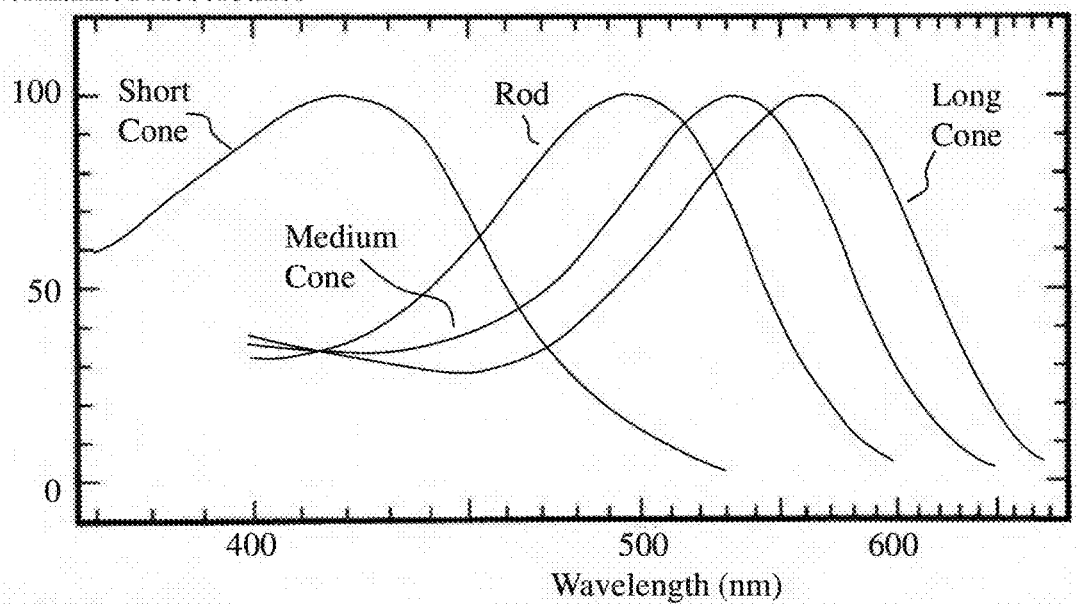
FIGS. 1A and 1B depict the respective rod and cone response characteristics to different wavelengths of light and resulting spatial/spectral performance of the human eye based upon their distributions upon the retina.

The present invention is directed to near-to-eye systems and more particularly to methods and devices for addressing optical aberrations within such near-to-eye systems and near-to-eye vision augmentation systems.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader.

A "fixed electronic device" (FED) as used herein and throughout this disclosure, refers to a wireless and /or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "head mounted display" (HMD) as used herein and throughout this disclosure refers to a wearable device that incorporates an image presentation device operating in conjunction with a microprocessor such that a predetermined portion of an image captured by the image capturing device is presented to the user on the image presentation device. A HMD may be associated with an image capturing device forming part of the HMD or it may incorporate an interface or interfaces for receiving an image provided from a source external to the HMD. This may include, but not be limited, to an imaging device associated with the user, an imaging device associated to the HMD via an interface, a remote imaging device, a portable electronic device, a fixed electronic device or any video and/or image source. The microprocessor and any associated electronics including, but not limited to, memory, user input device, gaze tracking, context determination, graphics processor, and multimedia content generator may be integrated for example with the HMD, form part of an overall assembly with the HMD, form part of the PED, or as discrete unit wirelessly connected to the HMD and/or PED.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A 'third party' or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

"User information" as used herein may refer to, but is not limited to, user behavior information and/or user profile information. It may also include a user's biometric/biomedical information, an estimation of the user's biometric/biomedical information, or a projection/prediction of a user's biometric/biomedical information derived from current and/or historical biometric/biomedical information.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, smart glasses, environmental sensors, medical sensors, biological sensors, physiological sensors, chemical sensors, ambient environment sensors, position sensors, and motion sensors.

"Biometric" or "biomedical" information as used herein may refer to, but is not limited to, data relating to a user characterised by data relating to a subset of conditions including, but not limited to, their eyesight, biological condition, physiological condition, ambient environment condition, position condition, neurological condition, drug condition, and one or more specific aspects of one or more of these said conditions.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

A "wearer", "user" or "patient" as used herein and through this disclosure refers to, but is not limited to, a person or individual who uses the HMD either as a patient requiring visual augmentation to fully or partially overcome a vision defect or as an ophthalmologist, optometrist, optician, or other vision care professional preparing a HMD for use by a patient. A "vision defect" as used herein may refer to, but is not limited, a physical defect within one or more elements of a user's eye, a defect within the optic nerve of a user's eye, a defect within the nervous system of the user, a higher order brain processing function of the user's eye, and an ocular reflex of the user. A "wearer" or "user" may also be an individual with healthy vision, using the HMD in an application other than for the purposes of ameliorating physical vision defects. Said applications could include, but are not necessarily limited to gaming, augmented reality, night vision, computer use, viewing movies, environment simulation, etc. Augmented reality applications may include, but are not limited to, medicine, visual assistance, engineering, aviation, tactical, gaming, sports, virtual reality, environment simulation, and data display.

An "aberration" or "optical aberration" as used herein and through this disclosure refers to, but is not limited to, a degradation and/or distortion imparted to an optical image by one or more optical elements individually or in combination such that the performance of the one or more optical elements individually or in combination departs from the performance predictions of paraxial optics. This includes, but is not limited to, monochromatic aberrations such as piston, tilt, defocus, spherical aberration, coma, astigmatism, field curvature, and image distortion. This includes, but is not limited to, chromatic dispersion, axial chromatic aberrations, and lateral chromatic aberrations.

1. Human Visual System

The human visual system is characterized by very high visual acuity in the center of the visual field, and very poor acuity in the periphery. This is determined by the density of light sensitive photoreceptors on the human retina, the so called "rods" and "cones". There are about six million cones in the human visual system (per eye), which are heavily concentrated in the central few degrees of a person's normal 180-190-degree field of view and contribute to a person's accurate vision and color perception. There are three types of cones differentiated by length, namely short, medium and long cones. Medium and long cones are primarily concentrated to the central few degrees whilst short cones are distributed over a large retinal eccentricity. In contrast there are about 120 million rods distributed throughout the retina which contribute to peripheral performance and are particularly sensitive to light levels, sudden changes in light levels, and are very fast receptors.

Figure 1B:
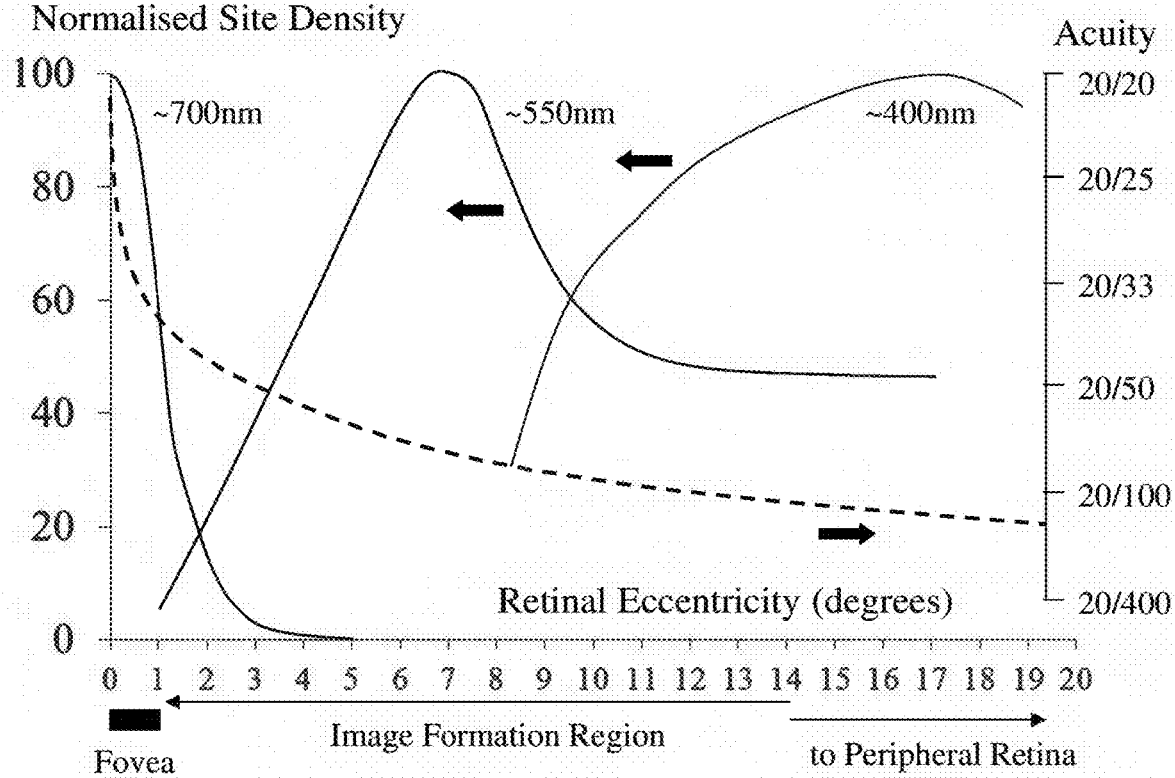

Referring to FIG. 1A the normalized absorbance of rods and cones as a function of wavelength. As shown rod absorbance peaks at around 498 nm whereas short, medium, and long cones peak at around 420 nm, 534 nm, and 564 nm respectively. Accordingly, short, medium, and long cones provide blue, green and red weighted responses to the field of view of the individual. The peak rod sensitivity is 400 compared with 1 for the cones such that rods provide essentially monochromatic vision under very low light levels. Further, the sensitivity of short, medium, and long cones varies such that short cones are approximately 20 times less sensitive than long cones. In a similar manner, long cones represent 64% of the cones within the human eye, medium cones 33% and short cones only 3%. The combinations of relative sensitivity, spectral sensitivities of the different cone types, and spatial distributions of the different cones types result in effective wavelength/spatial filtering of the human eye as a function of retinal eccentricity as depicted in FIG. 1B.

The visual acuity of a person with healthy eyesight is defined by the common nomenclature "20/X" which indicates that a person can see at 20 meters, what a healthy-sighted person could see from X meters. Accordingly, as visual acuity drops from 20/20 at the fovea, approximately the first degree of retinal eccentricity to below 20/100 above 15 degrees the effective wavelength response of the human eye is red dominant at the fovea transitioning to a green dominant region between a few degrees to approximately 10 degrees followed by a blue dominant region thereafter although the rod spectral response still provides significant green sensitivity. 20/20 vision corresponds to a person being able to perceive an object that subtends about one minute of arc, about $\frac{1}{60}$th degree, on the retina in the center of their vision.

Functionally, the human eye receives photons via the pupil and these are focused on the retina via the lens and cornea at the front of the eye. Cells in the retina are stimulated by incident photons in three ways. First, retinal photoreceptors, the rods and cones, respond to spectral qualities of the light such as wavelength and intensity. These photoreceptors in turn stimulate the retinal nerve cells, comprising bipolar cells, horizontal cell, ganglion cells, and amarcine cells. Although physically located in the eye, these nerve cells can be considered the most primitive part of the human brain and cortical visual function. It has also been shown that the response of photoreceptors and nerve cells improves when neighboring cells receive different spectral information. This can be considered the retina's response to spatial stimulus, that being the differences spatially between the light information incident on adjacent areas of the retina at any moment in time. Accordingly, contrast can be defined as spectral transitions, changes in light intensity or wavelength, across a small spatial region of the retina. The sharper these transitions occur spatially, the more effectively the human vision system responds. Additionally, the eye responds to temporal changes in information, i.e. where the information stimulating photoreceptors and retinal nerve cells changes either because of object motion, head/eye motion, or other changes in the spectral/spatial information from one moment in time to the next. It is important to note that a significant portion of the human visual function takes place in the brain. In fact, retinal nerve cells can be considered an extension of the cerebral cortex and occipital lobe of the brain.

2. Bioptic Head Mounted Displays

Figure 2:
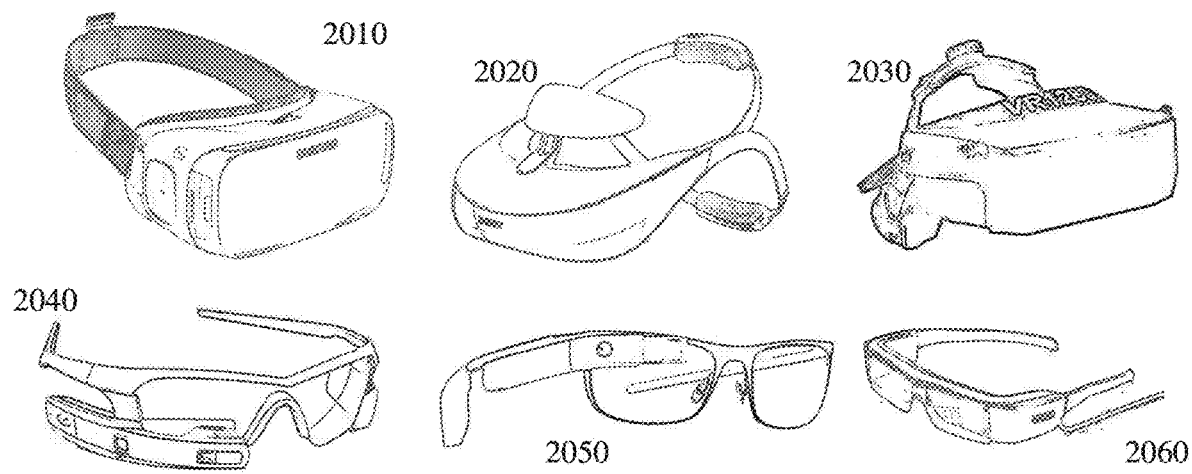
FIG. 2 depicts prior art immersive and augmented reality head mounted displays (HMDs)

Within the prior art head mounted displays (HMDs) have typically been geared to immersive use, e.g. the user sees only the images projected onto the display or towards augmented reality wherein the user views the real world and is presented additional information through the HMD. Examples of the former immersive HMDs are depicted in FIG. 2 and include Oculus Gear™ 2010 by Oculus™ in conjunction with Samsung™, the HMZ-T3W 2020 by Sony™, and the Virtual Research (VR) 1280 2030 by Panou™. In the latter augmented reality category are devices such as Recon Jet™ 2040 by Recon™, Google Glass 2050 by Google, and Moverio™ BT-200 2060 by Epson™. In the former immersive HMDs, the user views the display directly or displays directly and exclusively, whilst in the latter the user views the additional information as an overlay presented in addition to the user's native vision through a typically smaller display projected onto a smaller region of the user's retina.

All of these systems involve an optical train comprising at least the display and pupil of the user. Except in the most basic HMD system with just these two elements then additional optical elements are disposed within the optical train. These optical elements may include, but not limited to, corrective prescription glasses, contact lenses, a camera acquiring an image for display to the user, and one or more lenses and/or prisms disposed within the optical train. Accordingly, aberrations such as distortions and chromatic effects will require consideration and addressing in order to provide an optimal visual stimulus to the user. For example, within systems that place the displays in front of the user's eyes such as Oculus Gear™ 2010 then a pair of lenses provide slightly different views of the same display to the user to trigger depth perception whilst the Sony HMZ-T3W exploits a pair of lenses disposed between the user's pupils and the two display screens. In contrast, the Moverio™ BT-200 2060 in common with HMDs accordingly established by the inventors at eSight Inc. exploit projection optics through which the user views the world and onto which the augmented images and/or augmentation content are projected from optical displays mounted in the sides of the HMD such as with the Moverio™ BT-200 and eSight™ Generation 3 HMD or in the upper portion of the HMD projecting down such as with the Generation 1 and Generation 2 HMD from eSight™. Other side mounted displays exploit a variety of optical elements to re-direct the optical path from display to eye including, but not limited to, curved mirror (e.g., Vuzix™), diffractive waveguide (e.g. Nokia™ and Vuzix™), holographic waveguide (e.g. Sony and Konica-Minolta), polarized waveguides (e.g. Lumus), and reflective waveguides (e.g. Epson, Google, eSight).

Figure 3:
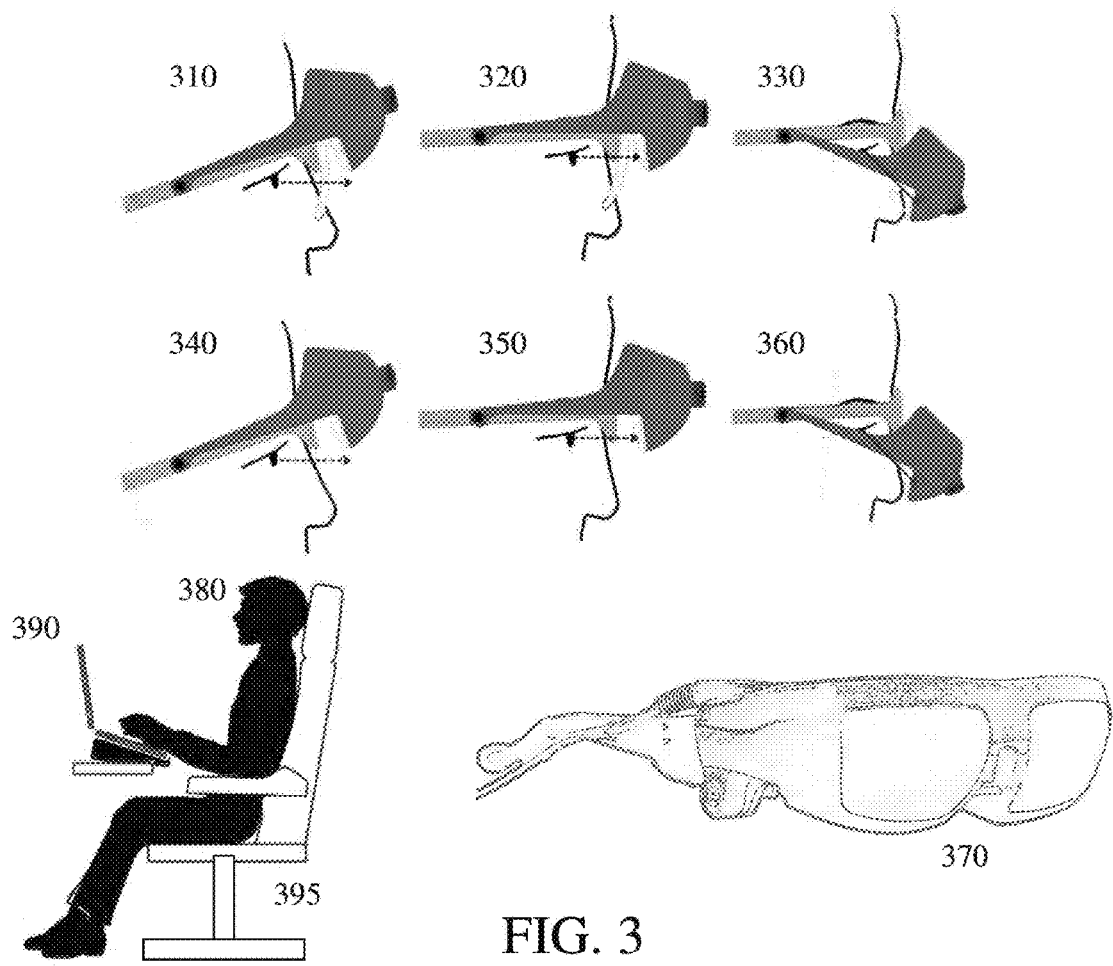
FIG. 3 depicts a bioptic head mounted device according to the prior art supporting embodiments of the invention.

The eSight™ HMDs support the users with and without refractive correction lenses as depicted in FIG. 3. There being shown by first to third schematics 310 to 330 respectively in the instance of corrective lenses and fourth to sixth schematics 340 to 360 respectively without lenses. Accordingly, a user 380 working with a laptop computer 390 would typically be sitting with their head in orientations depicted in second, third, fifth, or sixth schematic 320, 330, 350 and 360 respectively wherein the HMD is engaged. In this instance the laptop computer 390 may establish a direct WPAN or wired link to the HMD 370 thereby displaying the images to the user which would otherwise be displayed on the screen of the laptop computer. In some instances, the laptop computer, due to typically increased processing resources compared to HMD 370 or a PED to which the HMD 370 is connected, may have software in execution thereon to take over processing from the HMD 370 or PED. If the user tilts their head backwards with a weighted HMD bioptic system, then the HMD pivots out of the way as depicted in first and third schematics 310 and 340 respectively. Optionally, the HMD is manually pivoted out of the user's line of sight but they may still view the display by glancing upwards. In the third and sixth schematics 330 and 360 the user has tilted their head forward to view something wherein the camera within the HMD may tilt and/or zoom to provide a different viewpoint. Accordingly, in the different configurations the user may view the HMD itself in different orientations either directly without refractive correction lenses or through different regions of their refractive correction lenses.

3. HMD and Partnered Device Configuration

Figure 4:
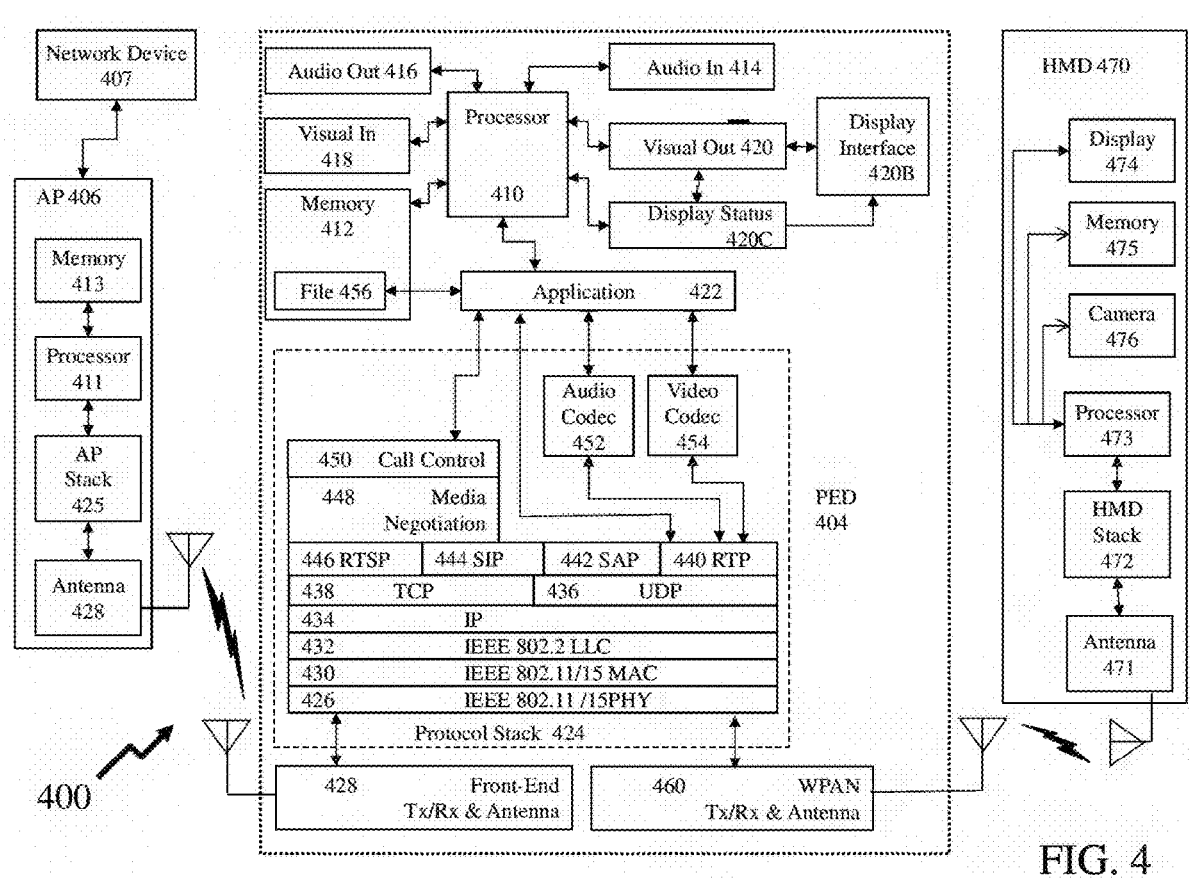
FIG. 4 depicts a portable electronic device supporting a head mounted device according to an embodiment of the invention.

Referring to FIG. 4 there is depicted a portable electronic device 404 supporting an interface to a HMD 470 according to an embodiment of the invention. Also depicted within the PED 404 is the protocol architecture as part of a simplified functional diagram of a system 400 that includes a portable electronic device (PED) 404, such as a smartphone, an access point (AP) 406, such as first Wi-Fi AP 110, and one or more network devices 407, such as communication servers, streaming media servers, and routers for example. Network devices 407 may be coupled to AP 406 via any combination of networks, wired, wireless and/or optical communication. The PED 404 includes one or more processors 410 and a memory 412 coupled to processor(s) 410. AP 406 also includes one or more processors 411 and a memory 413 coupled to processor(s) 411. A non-exhaustive list of examples for any of processors 410 and 411 includes a central processing unit (CPU), a digital signal processor (DSP), a reduced instruction set computer (RISC), a complex instruction set computer (CISC) and the like. Furthermore, any of processors 410 and 411 may be part of application specific integrated circuits (ASICs) or may be a part of application specific standard products (ASSPs). A non-exhaustive list of examples for memories 412 and 413 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

PED 404 may include an audio input element 414, for example a microphone, and an audio output element 416, for example, a speaker, coupled to any of processors 410. PED 404 may include a video input element 418, for example, a video camera, and a visual output element 420, for example an LCD display, coupled to any of processors 410. The visual output element 420 is also coupled to display interface 420B and display status 420C. PED 404 includes one or more applications 422 that are typically stored in memory 412 and are executable by any combination of processors 410. PED 404 includes a protocol stack 424 and AP 406 includes a communication stack 425. Within system 400 protocol stack 424 is shown as IEEE 802.11/15 protocol stack but alternatively may exploit other protocol stacks such as an Internet Engineering Task Force (IETF) multimedia protocol stack for example. Likewise, AP stack 425 exploits a protocol stack but is not expanded for clarity. Elements of protocol stack 424 and AP stack 425 may be implemented in any combination of software, firmware and/or hardware. Protocol stack 424 includes an IEEE 802.11/15-compatible PHY module 426 that is coupled to one or more Front-End Tx/Rx & Antenna 428, an IEEE 802.11/15-compatible MAC module 430 coupled to an IEEE 802.2-compatible LLC module 432. Protocol stack 424 includes a network layer IP module 434, a transport layer User Datagram Protocol (UDP) module 436 and a transport layer Transmission Control Protocol (TCP) module 438. Also shown is WPAN Tx/Rx & Antenna 460, for example supporting IEEE 802.15.

Protocol stack 424 also includes a session layer Real Time Transport Protocol (RTP) module 440, a Session Announcement Protocol (SAP) module 442, a Session Initiation Protocol (SIP) module 444 and a Real Time Streaming Protocol (RTSP) module 446. Protocol stack 424 includes a presentation layer media negotiation module 448, a call control module 450, one or more audio codecs 452 and one or more video codecs 454. Applications 422 may be able to create maintain and/or terminate communication sessions with any of devices 407 by way of AP 406. Typically, applications 422 may activate any of the SAP, SIP, RTSP, media negotiation and call control modules for that purpose. Typically, information may propagate from the SAP, SIP, RTSP, media negotiation and call control modules to PHY module 426 through TCP module 438, IP module 434, LLC module 432 and MAC module 430.

It would be apparent to one skilled in the art that elements of the PED 404 may also be implemented within the AP 406 including but not limited to one or more elements of the protocol stack 424, including for example an IEEE 802.11-compatible PHY module, an IEEE 802.11-compatible MAC module, and an IEEE 802.2-compatible LLC module 432. The AP 406 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module.

Also depicted is HMD 470 which is coupled to the PED 404 through WPAN interface between Antenna 471 and WPAN Tx/Rx & Antenna 460. Antenna 471 is connected to HMD Stack 472 and therein to processor 473. Processor 473 is coupled to camera 476, memory 475, and display 474. HMD 470 being for example HMD 370 described above in respect of FIG. 3. Accordingly, HMD 470 may, for example, utilize the processor 410 within PED 404 for processing functionality such that a lower power processor 473 is deployed within HMD 470 controlling acquisition of image data from camera 476 and presentation of modified image data to user via display 474 with instruction sets and some algorithms for example stored within the memory 475. It would be evident that data relating to the particular individual's visual defects may be stored within memory 412 of PED 404 and/or memory 475 of HMD 470. This information may be remotely transferred to the PED 404 and/or HMD 470 from a remote system such as an optometry system characterising the individual's visual defects via Network Device 407 and AP 406. For example, the eSight Generation 3 HMD supports a wired USB connection to the PED/FED as well as a Bluetooth connection. Accordingly, a Wi-Fi connection to the HMD 470 would be via the PED/FED and either the Bluetooth or wired connection.

Optionally, the processing of image data may be solely within the HMD 470, solely within the PED 404, distributed between them, capable of executed independently upon both, or dynamically allocated according to constraints such as processor loading, battery status etc. Accordingly, the image acquired from a camera associated with the HMD 470 may be processed by the HMD 470 directly but image data to be displayed acquired from an external source processed by the PED 404 for combination with that provided by the HMD 470 or in replacement thereof. Optionally, processing within the HMD 470 may be offloaded to the PED 404 during instances of low battery of the HMD 470, for example, wherein the user may also be advised to make an electrical connection between the HMD 470 and PED 4040 in order to remove power drain from the Bluetooth interface or other local PAN etc.

Accordingly, it would be evident to one skilled the art that the HMD with associated PED may accordingly download original software and/or revisions for a variety of functions including diagnostics, display image generation, and image processing algorithms as well as revised ophthalmic data relating to the individual's eye or eyes. Accordingly, it is possible to conceive of a single generic HMD being manufactured that is then configured to the individual through software and patient ophthalmic data. Optionally, the elements of the PED required for network interfacing via a wireless network (where implemented), HMD interfacing through a WPAN protocol, processor, etc. may be implemented in a discrete standalone PED as opposed to exploiting a consumer PED. A PED such as described in respect of FIG. 4 allows the user to adapt the algorithms employed through selection from internal memory as well as define an ROI through a touchscreen, touchpad, or keypad interface for example.

Further the user interface on the PED may be context aware such that the user is provided with different interfaces, software options, and configurations for example based upon factors including but not limited to cellular tower accessed, Wi-Fi/WiMAX transceiver connection, GPS location, and local associated devices. Accordingly, the HMD may be reconfigured upon the determined context of the user based upon the PED determined context. Optionally, the HMD may determine the context itself based upon any of the preceding techniques where such features are part of the HMD configuration as well as based upon processing the received image from the camera. For example, the HMD configuration for the user wherein the context is sitting watching television based upon processing the image from the camera may be different to that determined when the user is reading, walking, driving etc. In some instances, the determined context may be overridden by the user such as, for example, the HMD associates with the Bluetooth interface of the user's vehicle but in this instance the user is a passenger rather than the driver.

It would be evident to one skilled in the art that in some circumstances the user may elect to load a different image processing algorithm and/or HMD application as opposed to those provided with the HMD. For example, a third party vendor may offer an algorithm not offered by the HMD vendor or the HMD vendor may approve third party vendors to develop algorithms addressing particular requirements. For example, a third party vendor may develop an information sign set for the Japan, China etc. whereas another third party vendor may provide this for Europe.

Optionally the HMD can also present visual content to the user which has been sourced from an electronic device, such as a television, computer display, multimedia player, gaming console, personal video recorder (PVR), or cable network set-top box for example. This electronic content may be transmitted wirelessly for example to the HMD directly or via a PED to which the HMD is interfaced. Alternatively, the electronic content may be sourced through a wired interface such as USB, I2C, RS485, etc. as discussed above. In the instances that the content is sourced from an electronic device, such as a television, computer display, multimedia player, gaming console, personal video recorder (PVR), or cable network set-top box for example then the configuration of the HMD may be common to multiple electronic devices and their "normal" world engagement or the configuration of the HMD for their "normal" world engagement and the electronic devices may be different. These differences may for example be different processing variable values for a common algorithm or it may be different algorithms.

4. Optical Prism Design

Figure 5:
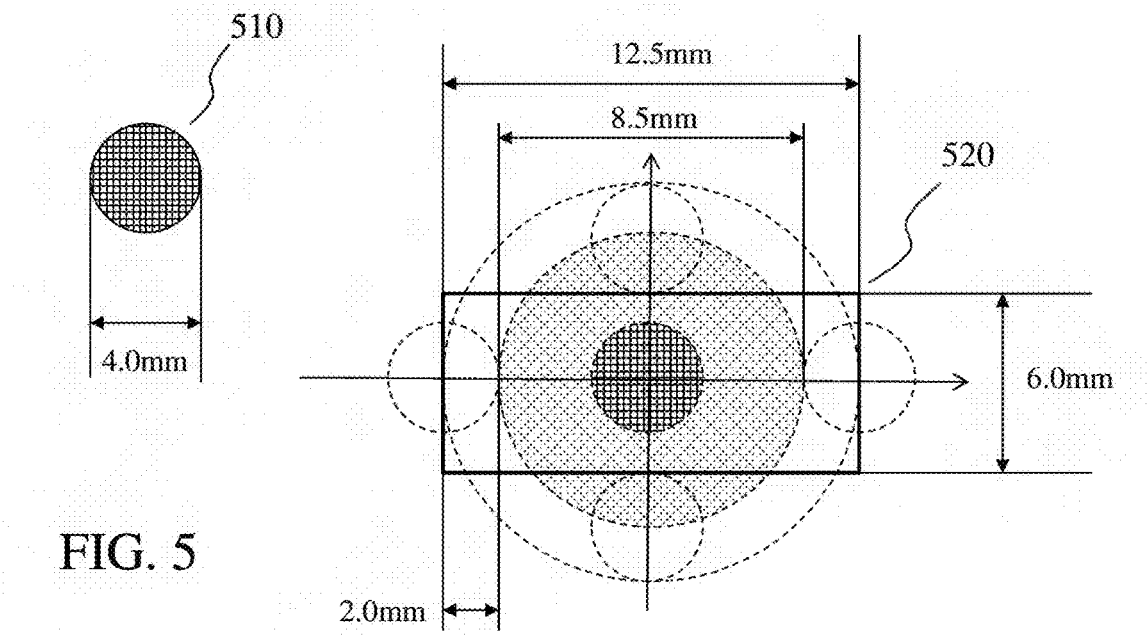
FIG. 5 depicts construction of a visual eye box for a HMD to define the optical lens.

Referring to FIG. 5 there is depicted construction of a visual eye box for analyzing the optical train with a HMD to analyse and define the optical lens coupling the image presented on the display to the user. Within the HMD according to an embodiment of the invention for which the design process is discussed the display is disposed to the side of the user's head rather than above their eyes. Accordingly, the lens receives on an edge towards the left or right hand temple of the user depending upon whether the lens is presenting content to the user's left or right eye and as such the image is presented by reflecting the image of the lens into the user's pupil 510. A typical dimension within the modelling and analysis for the pupil 510 was a circle of 4 mm diameter. The display, for example, using a Sony ECX331 micro-display provides a 1024×768 pixel image within a 10.336 mm wide and 7.8 mm high window. Alternatively, an eMagin 800×600 pixel display offers increased dimensions of 19.8 mm wide and 15.2 mm high.

Accordingly, this presents a field of view (FoV) of approximately 35°×26° versus 30°×22.5° with the Sony display with a target minimum eye relief (distance of lens from pupil) of 20 mm. Accordingly, the eye-box 520 for the analysis was defined as being 12.5 mm×6 mm as depicted in FIG. 5.

Figure 6:
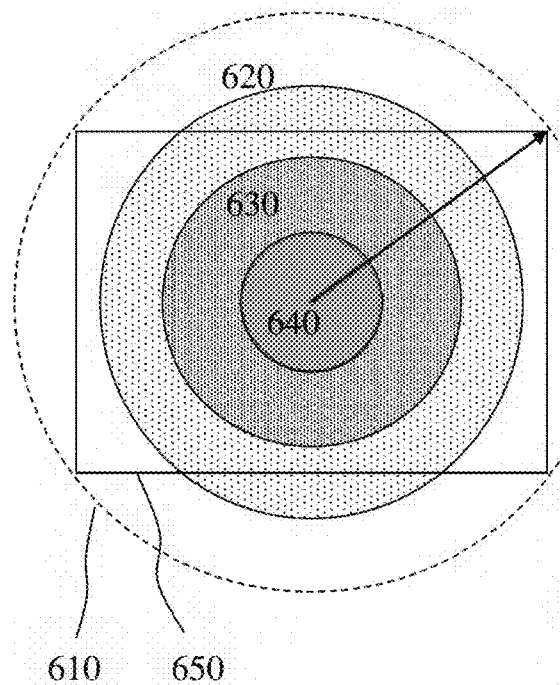
FIG. 6 depicts the association of zones of vision to the visual eye box based upon field of view of the display element within the HMD.

Then referring FIG. 6 there are depicted associated of zones of vision to the visual eye box based upon field of view of the display element within the HMD based upon the consideration of modulation transfer function (MTF) for an image contrast of 10% (referred to hereafter as MTF10). MTF is the spatial frequency response of an imaging system or a component and is the contrast at a given spatial frequency relative to low frequencies. This spatial frequency is typically measured in line pairs per millimeter (lp/mm) or arc angle subtended by a line pair. A higher spatial frequency, higher MTF10 value, corresponds to the user resolving finer image data which can be considered as either their perceiving a sharper image or defining a limit to content to display as lower MTF10 implies reduced perception of the content displayed. Accordingly, as evident in FIG. 6 for a display having a 36° FoV four regions were defined as being the eyebox 610 and first to third circular regions 620 to 640. Within the eyebox 610 the MTF10 was established at >38.5 lp/mm (<2.3 arcmin) which increased within first to third circular regions 620 to 640 to >42, >46.5, and >50 respectively corresponding to angular resolutions of <2.1, <1.9, and <1.75 respectively.

Figure 7:
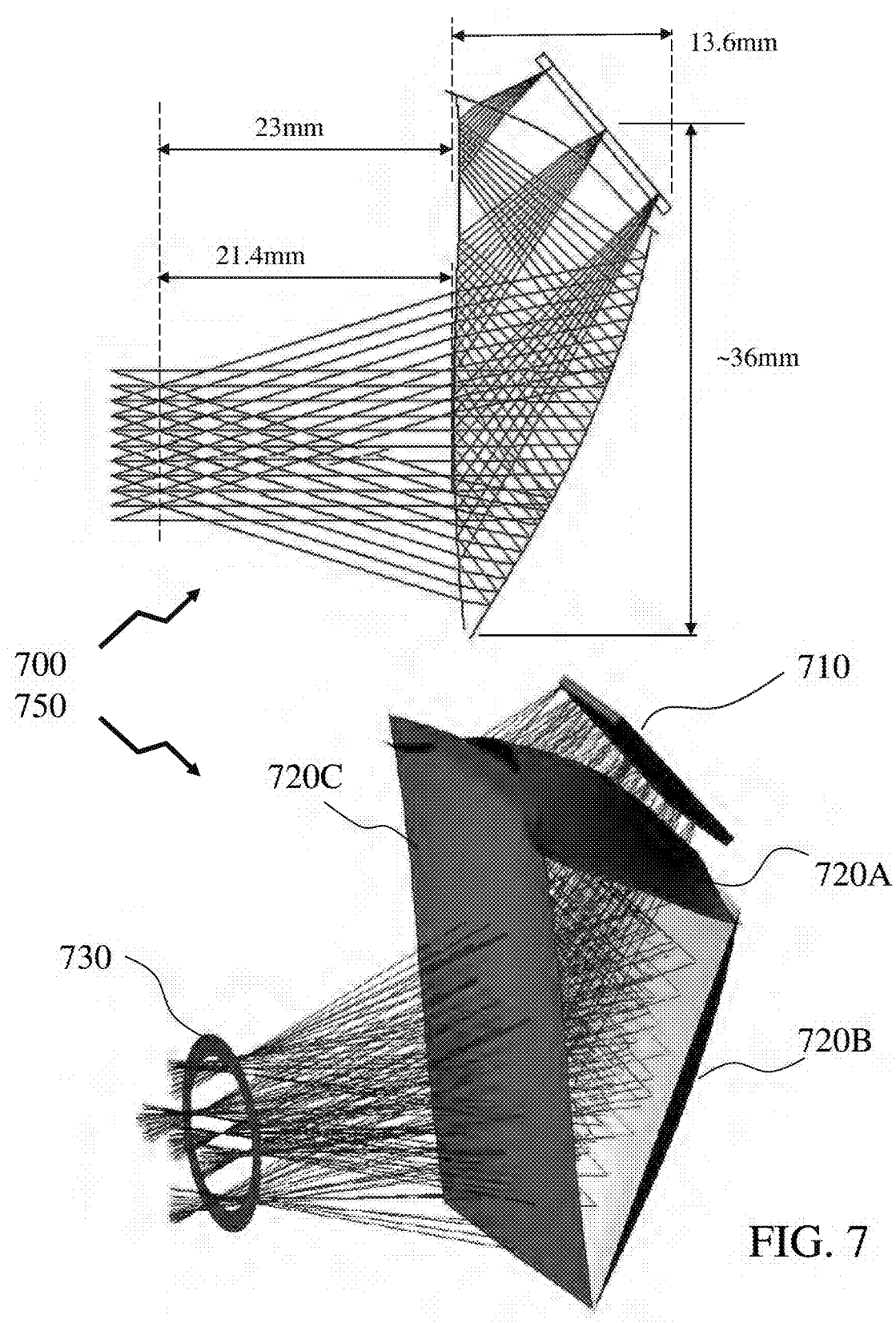
FIG. 7 depicts optical ray tracing images of modelling for the optical lens within an HMD.
Figure 11:
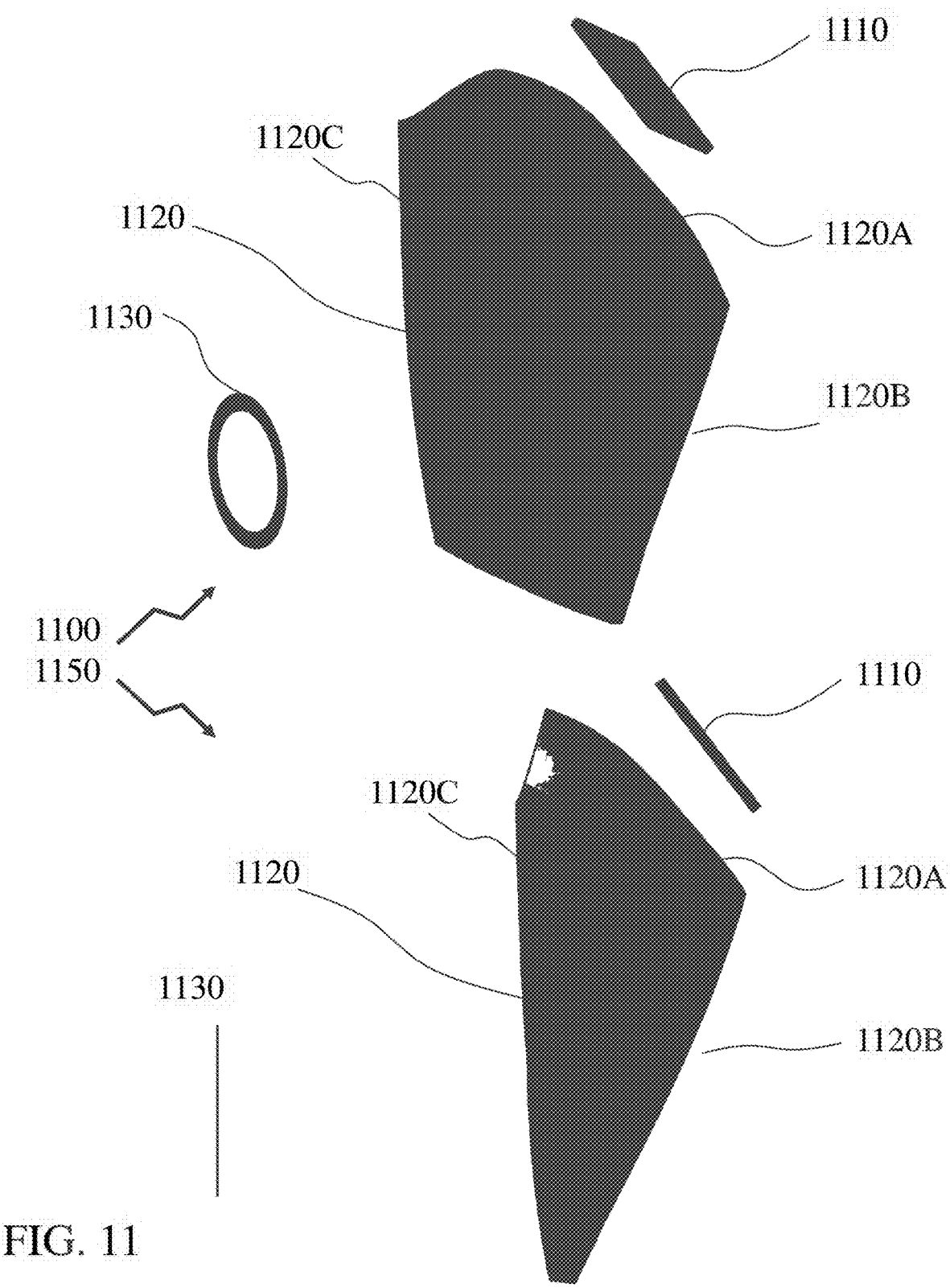
FIG. 11 depicts perspective and top view of the optical lens yielding the simulation results depicted in FIG. 10.

Accordingly, the optical lens FIG. 7 depicts optical ray tracing in first and second images 700 and 750 respectively of computer aided design (CAD) modelling for the optical lens within an HMD. First image 700 is a cross-sectional plan view of a lens, referred to as a prism lens by the inventors, according to an embodiment of the invention whilst second image 750 depicts a perspective view wherein the image on display 710 is coupled to the pupil 730 of the user via the prism lens which comprises first facet 720A towards the display, second facet 720B which the projecting image reflects off, and third facet 720C which, in addition to providing the exit facet from the prism lens to the pupil 730 also has the projecting image reflecting off it. Accordingly, the optical path from the display 710 to pupil 730 is through the first facet 720A, reflecting off the third facet 720C, reflecting off the second facet 720B and transmitting through the third facet 720C. It would be evident to one of skill in the art that the prism lens depicted in FIG. 7 comprising first to third facets 720A to 720C respectively may be formed as single element. Optionally, the first to third facets 720A to 720C may be discrete prism lens elements assembled to provide the required functionality. A CAD image of a single piece part prism lens comprising first to third facets 720A to 720C respectively is depicted in FIG. 11.

Accordingly, the CAD analysis varies the surfaces of the prism lens, depicted as first to third facets 720A to 720C respectively with varying spatial frequencies of the source image. Accordingly, for each prism lens design iteration a plot of the diffraction limited optical MTF can be obtained, such as early iteration 800 and late iteration 850 In FIG. 8 allowing the modulation (contrast) to be of the prism lens design with varying position on the eye-box/source image to be analysed. Accordingly, at the outer edges of the eye-box the curves drop to low modulation (contrast) such that curves 810 drop to 10% and below at MTF of approximately 39 (MTF10). Whilst meeting the design objective of >38.5 at the outer edges of the eye-box there is not a lot of margin in the design whose results are depicted in early iteration 800 whereas in later iteration the MTF10 is increased to approximately 41.

Similarly, the root mean square spot size (RMS) diameter versus field angle for the user when their pupil is centered at the center of the eye-box can be derived and plotted. Accordingly, this RMS diameter can be plotted for the same design iterations as providing the results depicted in FIG. 8 yielding the first and second plots 900 and 950 in FIG. 9. Accordingly, it is evident in first plot 900 that high field angles the RMS spot diameter becomes quite large whilst in second plot 950 significantly lower RMS spot diameters are evident even at high angular field angles in both X (lateral) and Y (vertical) directions.

Figure 9:
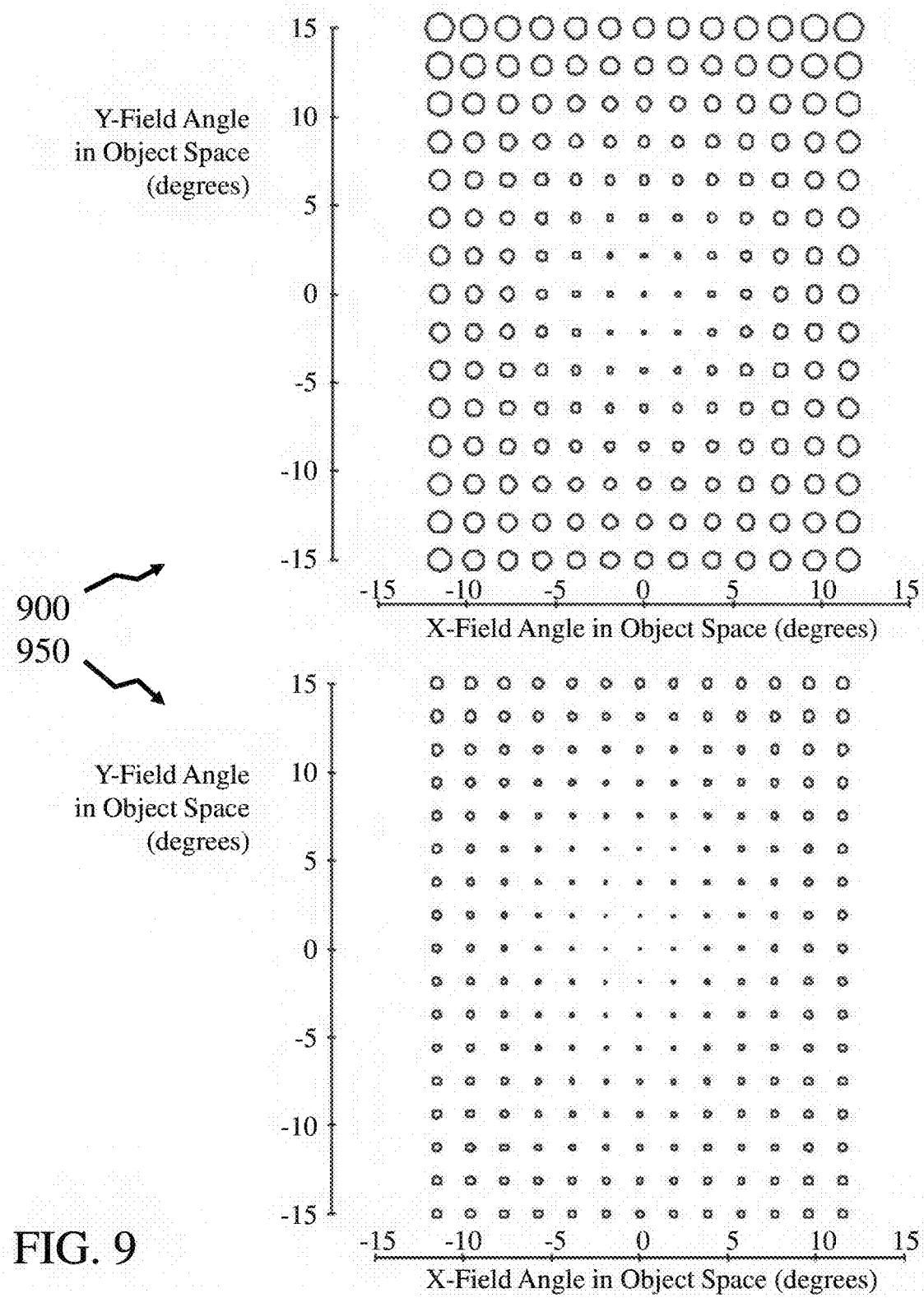
FIG. 9 depicts the variation of a point in the source image versus field angle.
Figure 10:
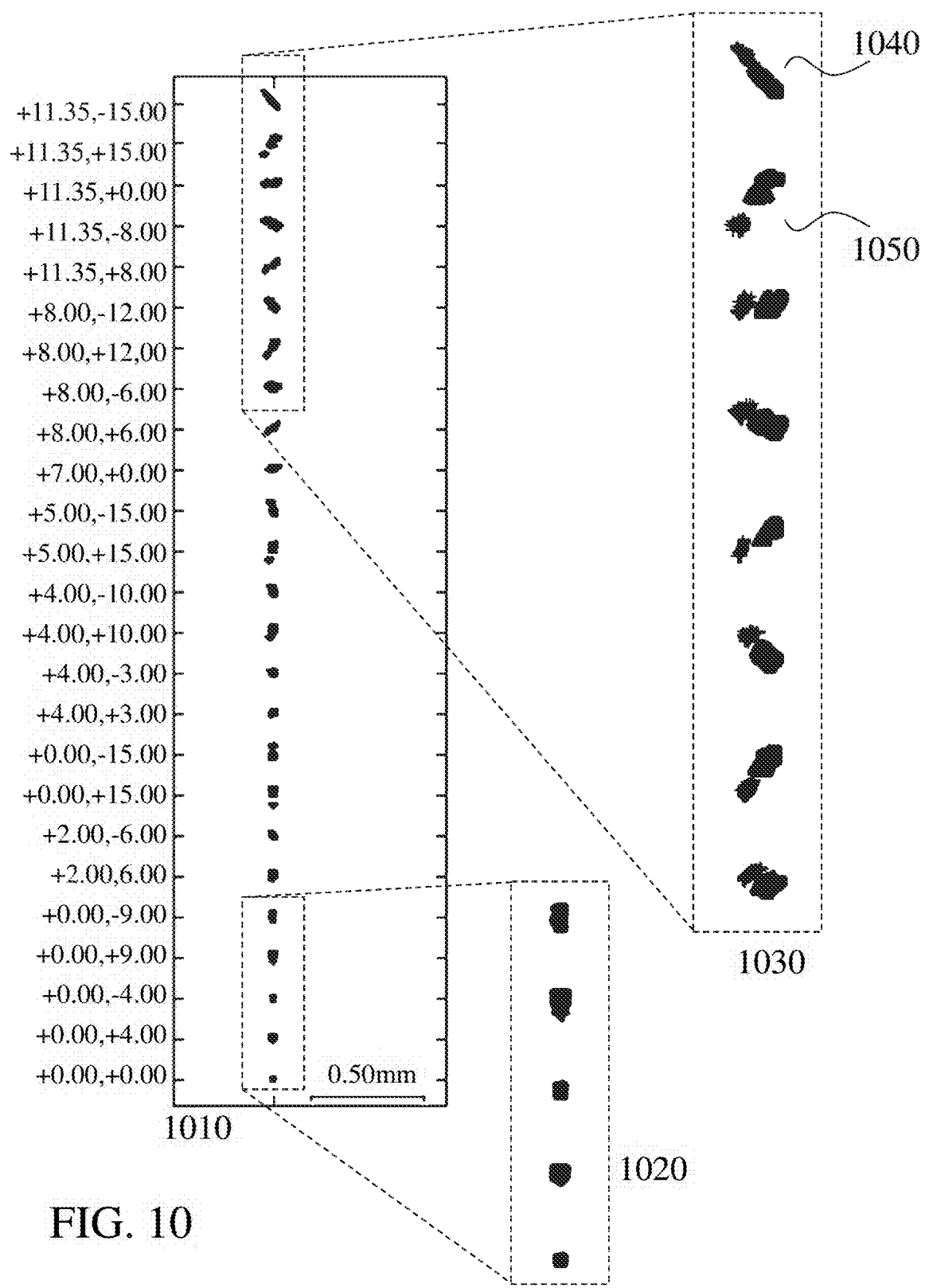
FIG. 10 depicts the variations in chromatic aberration versus position within the user's field of view for an image displayed with a lens according to a subsequent iteration of the design depicted in FIG. 7.

However, even though the MTF10 can be increased to a high lines per millimeter or low arc second value and the RMS spot diameter can be decreased through the design iterations of the prism lens it is evident from further analysis depicted in FIG. 10 that a significant contribution to degradation at high angular field angles still arises from chromatic aberration. Within the design goals of the prism lens the use of poly(methyl methacrylate) (PMMA) was a material limitation imposed. PMMA is a highly transparent thermoplastic commonly employed as a lightweight or shatter-resistant alternative to soda-lime glass. The refractive index of PMMA within the visible wavelength range from n=1.5052 at 405 nm to n=1.4587 at 750 nm, i.e. Δn=−0.0465. In contrast, soda lime glass ranges from n=1.5366 at 405 nm to n=1.5183, i.e. Δn=−0.0183. Accordingly, the dispersion of soda lime glass is approximately 40% that of PMMA. However, considering the prism lens depicted in FIG. 7 then a pair of these lenses would weight approximately 22 g whilst the PMMA would weigh approximately 10 g and be significantly lower cost. It could be evident that other materials may be employed which will present different absolute refractive indices and different dispersion characteristics. Accordingly, the properties of the HMD prism lens vary with wavelength adding to the aberrations within the prism lens. Each pixel within the display is actually three or more emitting elements such that the green, red and blue contributions for each pixel originate in different physical locations. However, it is evident from FIG. 9 and FIG. 10 described below that a multi-dimensional tradeoff between material dispersion, material cost, prism lens weight, etc. and the residual optical aberration exits within the design space accessible to designers implementing prism lens designs for HMDs.

5. Pixel Pre-Distortion/Texture Mapping

Accordingly, in FIG. 10 first image 1010 depicts the red, green, blue distributions with angular field position from high angular positions at the top to central to the field of view at the bottom. Second and third images 1020 and 1030 depict these lower and upper limits respectively showing that the distribution evolves from three closely mapped distributions to three angularly distributed distributions. It is further evident comparing first distribution 1040 at angular coordinates (11.35°, −15.00°) with second distribution 1050 at angular coordinates) (11.35°, 15.00°) that the performance of the prism lens is not symmetric relative to its axis.

Accordingly, it is evident that for the optical prism within a HMD, whether mounted horizontally or vertically relative to the user's eyes that there is a resulting chromatic map or matrix that identifies the translation of the separate red, green, and blue (RGB) colours either relative to each other or in absolute coordinates for a given pixel within the display to its projected image at each X, Y position. The dimensions of the chromatic map (CHRODISMAP) may, for example, be 1024×768 for every pixel within the display (e.g. Sony ECX331 micro-display) or it may be a reduced matrix according to a region map of the display. The CHRODISMAP input dimensions may exceed the output dimensions, or vice-versa, to accommodate differing display sub-system characteristics, motion-compensation edge-allowances, etc.

CHRODISMAP may be one of a plurality of maps employed within the design and/or implementation of image processing within an HMD including, but not limited to:

Cross-Mapping: which provides a mapping of the display coordinate system to the prism viewing area coordinate system;

Chromatic Dispersion Map (CHRODISMAP): which provides a matrix of chromatic dispersion translations using, for example, the prism viewing area coordinates and can vary from full mapping to subset/sampling within the coordinate system and/or prism viewing area, and may be absolute or relative to another mapping; and Distortion Map (DISMAP): which provides a matrix of coordinate translations using, for example, the prism viewing area coordinates and can vary include a full mapping, a subset/sample mapping within the coordinate system, or a subset/sample mapping within the prism viewing area.

For example, an entry into a CHRODISMAP would identify the intended pixel location and the displacements for the R, G, B sub-pixels of the source pixel from their intended pixel locations. Alternatively, an entry into a CHRODISMAP may identify the intended pixel location, a reference color (e.g. G), and the displacements for the R and B sub-pixels of the source pixel from their intended pixel locations. Alternatively, an entry into a CHRODISMAP may identify the micro-display origin pixel location, and the corresponding coordinates for the R, G, B sub-pixels as perceived by the user.

These displacements and measures of location may be defined in terms of pixel units or other geometric coordinate systems. Optionally, a CHRODISMAP may be provided that identifies the measured or designed pixel location and a corrected pixel displacement or location (could be absolute or relative coordinates). Optionally, the CHRODISMAP may be combined with other maps of the display/HMD optical system.

The chromatic dispersion and distortion within freeform prisms results from physical optical constraints and material constraints and is one of the distortions within freeform prisms that needs to be factored into the design process. Practically they cannot be avoided. If a designer sought to make distortions unperceivable then the result would be a significant reduction in the overall image quality and/or field of view. Accordingly, within the design process of freeform prisms the relaxation of the boundary condition for a non-distorted image allows the overall perceived image quality and/or field of view to be improved.

Optionally, the chromatic dispersion and the aberrations may be removed or reduced by the introduction of a second material into the design of the freeform prism such that the dispersion/aberration within the second portion offsets that introduced by the first portion. However, in many applications, such as HMDs for example, the requirements of reducing size, weight and cost as well as their overall restrictions within the design framework are such that this option is not feasible.

However, the inventors have established alternate methodologies to the solution of this problem, namely the electronic based correction of distortion and chromatic dispersion. With the advances in portable electronics, solid state displays (e.g. LCD or LED displays), digital image processing/generating systems for graphic, gaming, entertainment etc. then digital electronics with high processing capacity and specialized processors becomes feasible in small form factors. Such systems allow for the processing of individual pixels of individual frames in real time without adding significant latency which is important in applications such as immersive augmented reality with HMDs requiring processing of real time video streams, e.g. video streams with many image frames per second. Accordingly, a purely electronic solution may be provided or a combined solution wherein the control/processing electronics act in combination with a display.

Within FIG. 11 perspective and plan views 1100 and 1150 of a prism lens designed through a process as described supra according to an embodiment of the invention are depicted. The prism lens in FIG. 11 being deployed within an HMD such as depicted in FIG. 3 manufactured by eSight in a horizontal orientation such that the OLED displays 1110 for each of the left and right eyes are at the outer edges of the HMD. The relative position of the OLED display 1110, prism lens 1120 and user s pupil 1130 being shown in FIG. 11.

Figure 12:
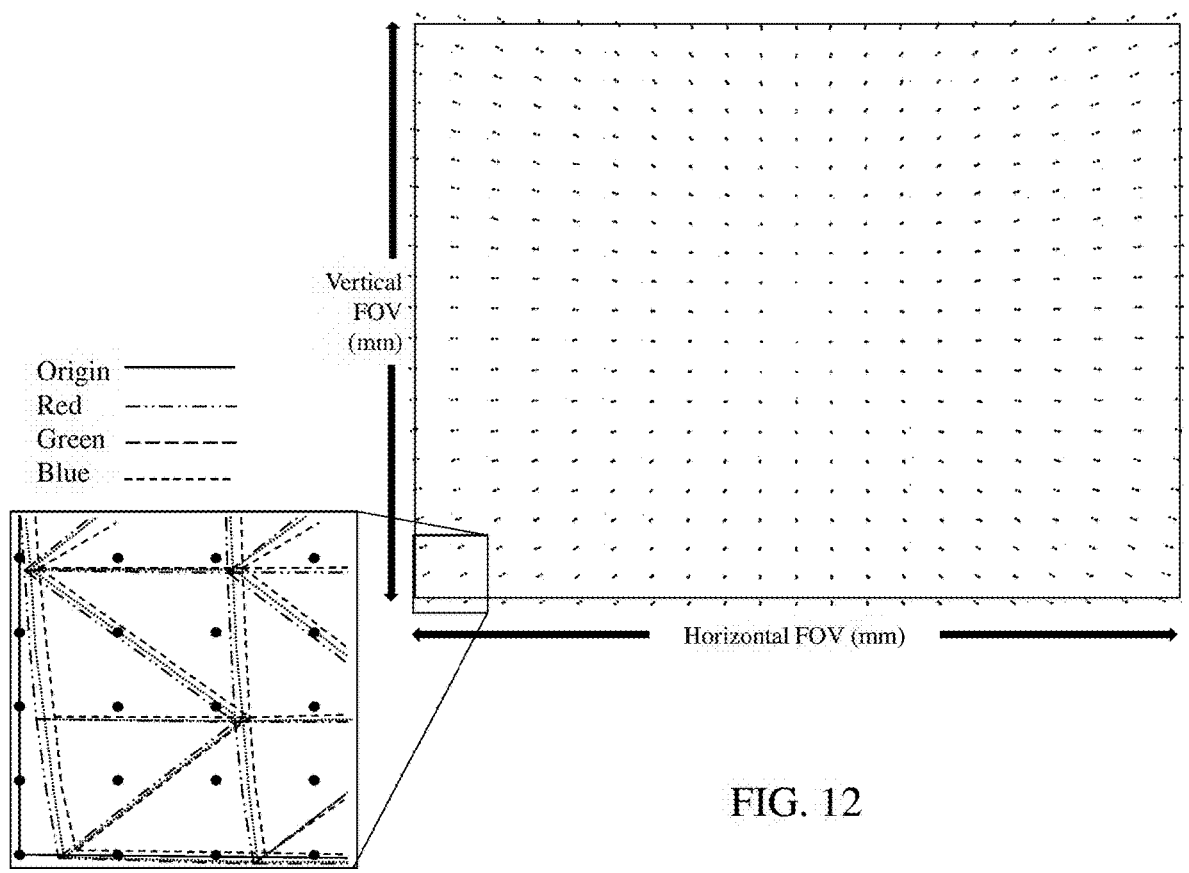
FIG. 12 depicts simulated geometric distortion versus position within the user's field of view for an image displayed with the lens according to FIGS. 10 and 11 with a point-clouds of true and distorted/chromatically-dispersed red, green and blue wavelengths using a prism lens such as depicted in FIGS. 7 and 10-11.

A 21×21 CHRODISMAP for such a prism lens as depicted in FIG. 12, which represents the latter design iteration whose results are depicted in late iteration plot 850 in FIG. 8 and second plot 950 in FIG. 9. Accordingly, it can be seen how the resulting "grid" from the display is distorted slightly in what is known as a "barrel" distortion although other distortions may be encountered including, for example, so-called pincushion, "coma", "astigmatism", and higher order spherical/non-spherical distortions.

Optionally, a single CHRODISMAP map may be used for both left and right eyes (for example same freeform prism but inverted in one eye relative to the other eye) or unique CHRODISMAP maps may be employed for each eye. Optionally, by mirroring the freeform prism design for left and right prisms and using the horizontal orientation for the prism then the left and right maps are mirror images of each other. In vertical prism orientations the same left and right maps may be used. To save on digital memory within a PED providing processing to an associated HMD or within the HMD electronics directly then a single map may also be used in horizontal configurations by traversing the map in the opposite direction when performing the real-time corrections.

According to embodiments of the invention different methods may be employed including, but not limited to those described within this specification in respect of FIGS. 5 to 34. An optional method may comprise the following steps:

Step 1: Pre-process a dispersion map to create a complete display reverse map for the given display. The complete map has entries for each pixel. Pre-processing interpolates or extrapolates from the dispersion map. Interpolation/extrapolation may be performed in a line by line fashion or by other method known in the art and may be linear or non-linear. Each entry in the reverse map identifies where a given pixels R, G and B locations should be moved to in order to present the user's exit pupil with a chromatically fused display. Store the map for use in real-time video or image processing.

Step 2: Pre-process distortion map. Optionally this can be performed at the same time as Step 1 or subsequently as these first and second steps are pre-processing and the results stored for use in the real time image correction within the HMD.

Step 3: Using the pre-processed "complete display reverse map", for each display image frame, translate the individual R, G and B pixels to their mapped location before display. The result of this will present the user with a chromatically fused non-distorted image.

An alternate method may comprise using just the dispersion and distortion maps to interpolate or extrapolate and translate each pixel during video processing. This is more computationally expensive but depending upon the electronic system may be faster or more power efficient.

Figure 13:
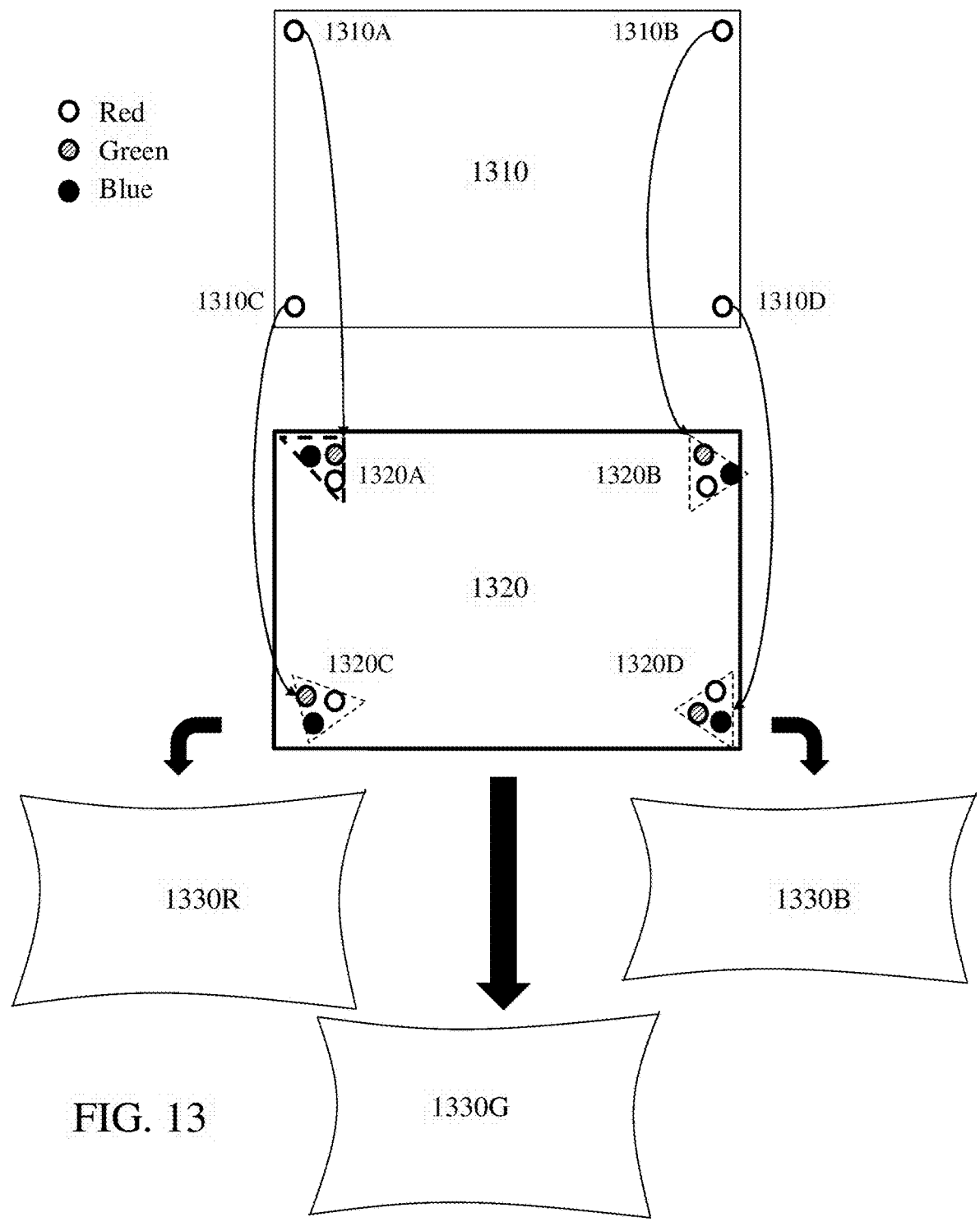
FIG. 13 depicts schematically the point-cloud of true and distorted/chromatically-dispersed red, green, and blue wavelengths using a prism lens such as depicted in FIGS. 7 and 10-12.

Now referring to FIG. 13 this mapping of source image pixels within the HMD micro-display 1310 to users eye box 1320 is depicted simply for four corner pixels 1310A to 1310D resulting in first to fourth chromatic dispersed regions 1320A to 1320D with specific red, green, and blue wavelengths for a white corner pixel 1310A to 1310D respectively. Accordingly, for each of red, green, and blue wavelengths there are corresponding red, green, and blue CHRODISMAPs 1330R, 1330G, and 1330B respectively. This mapping to generate red, green, and blue CHRODISMAPs 1330R, 1330G, and 1330B respectively was selected based upon the pixels within an OLED display as may typically be employed within HMDs. Accordingly, the generation of the red, green, and blue CHRODISMAPs 1330R, 1330G, and 1330B respectively and their associated users eye box mapping 1320 (from the HMD micro-display 1310 as a result of the prism lens, and any other dispersive/aberration generating optical elements, within the optical path from the HMD display to the user s pupil and therein retina) may be established through design simulation such as described and depicted and/or experimental characterization of each HMD prism lens.

Figure 14A:
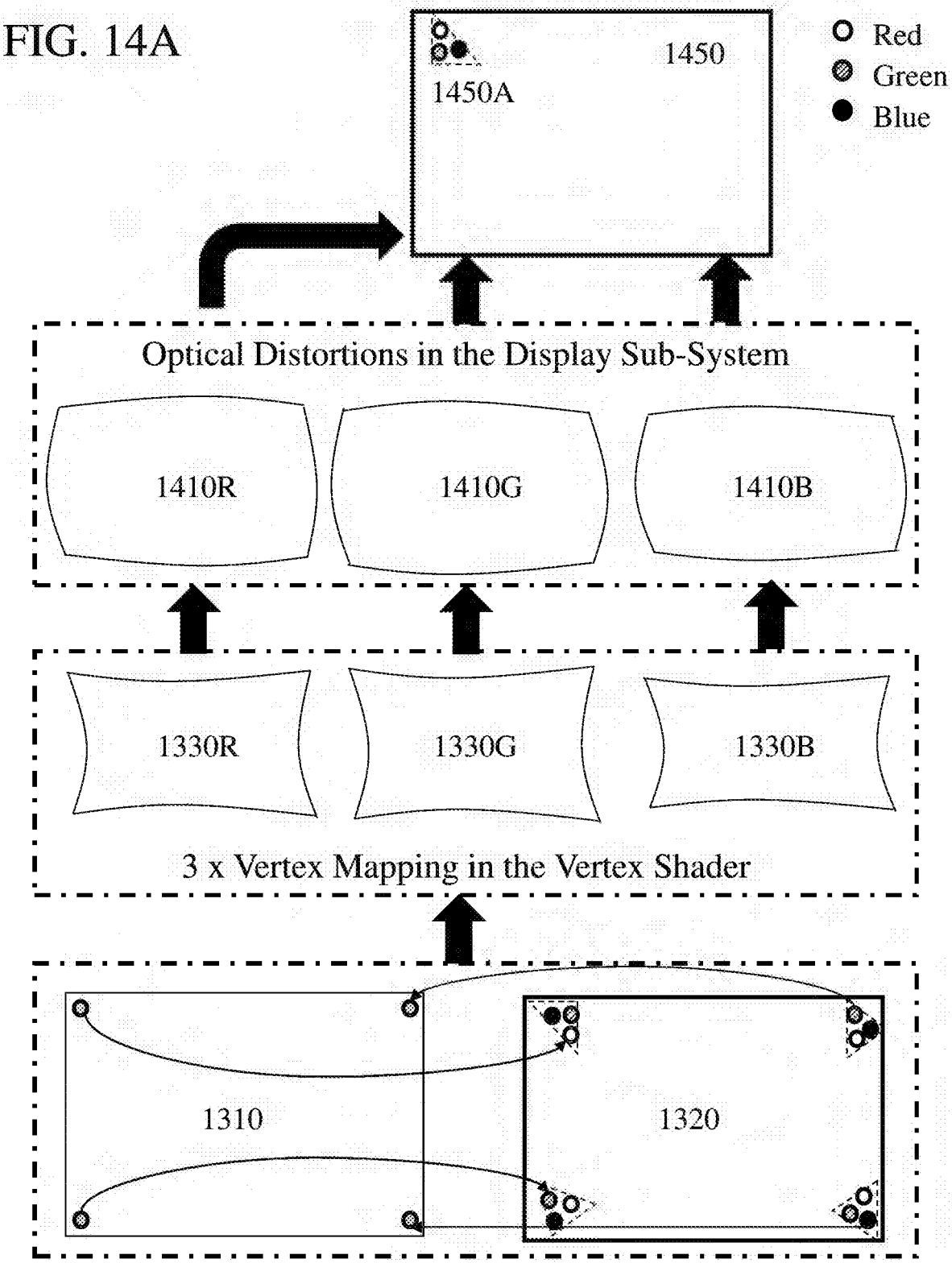
FIG. 14A depicts schematically the process of establishing three separate triangular tessellations of the distorted and chromatically-dispersed image-surfaces which are employed in correcting for the optical aberrations within a prism lens such as depicted in FIGS. 7 and 10-12 of FIG. 21 which are employed as depicted in FIG. 14B to provide display groupings of pixels which when subject to the aberrations of the optical train between the display and user's eye are rendered as a single pixel to the user.

Accordingly, for each red, green, and blue CHRODISMAPs 1330R, 1330G, and 1330B respectively a corresponding set of red, green, and blue coordinate maps may be generated as depicted in FIG. 14A. In essence, each of the red, green, and blue maps 1410R, 1410G, and 1410B respectively define the location of a pixel within a display that is subjected to optical aberrations such that its position at the pupil of the user's eye is aligned to a grid representing the HMD display without optical aberration at the user's pupil. Accordingly, as depicted source grouping 1450A represents red, green, and blue pixels which when subjected to the optical dispersion/aberration of the prism lens are aligned at the user s pupil. This being depicted in FIG. 14B where first to fourth "pixel groupings" 1420A to 1420D respectively on display 1420 map to first to fourth pixels 1430A to 1430D respectively within mapped display 1430 at the user s pupil. Essentially, the inventors compensate by pre-distorting the red, green, and blue pixel locations such that they are distorted to overlap at the pupil of the user s eye. The inventor's refer to this as pixel pre-distortion.

Accordingly, the generation of the image on the display may, within embodiments of the invention, be reduced to a simple lookup table process wherein each pixel within the acquired image with or without additional image processing is mapped to a pixel within the display. As such populating the data for the display is achieved with low latency.

5. HMD Image Processing System and Latency

HMD systems in applications outside gaming wherein the user is interacting with the real world either with the HMD providing correction/compensation of the user's visual defects or providing augmented reality require low latency in order to avoid physical side-effects for the user. This, for example, may be evident as instability or nausea where there perceived external environment behaves differently to that expected through their eye's motion and/or inertial sense. However, the latency of an HMD is generally dispersed across a series of electrical and optical elements and is difficult to minimize even without considering the requirements of image processing for aberration reduction, e.g. pixel pre-distortion, for enhanced user perception, e.g. spatially, spectrally and temporally varying edges of objects to enhance recognition, contrast enhancement etc.

Figure 15:
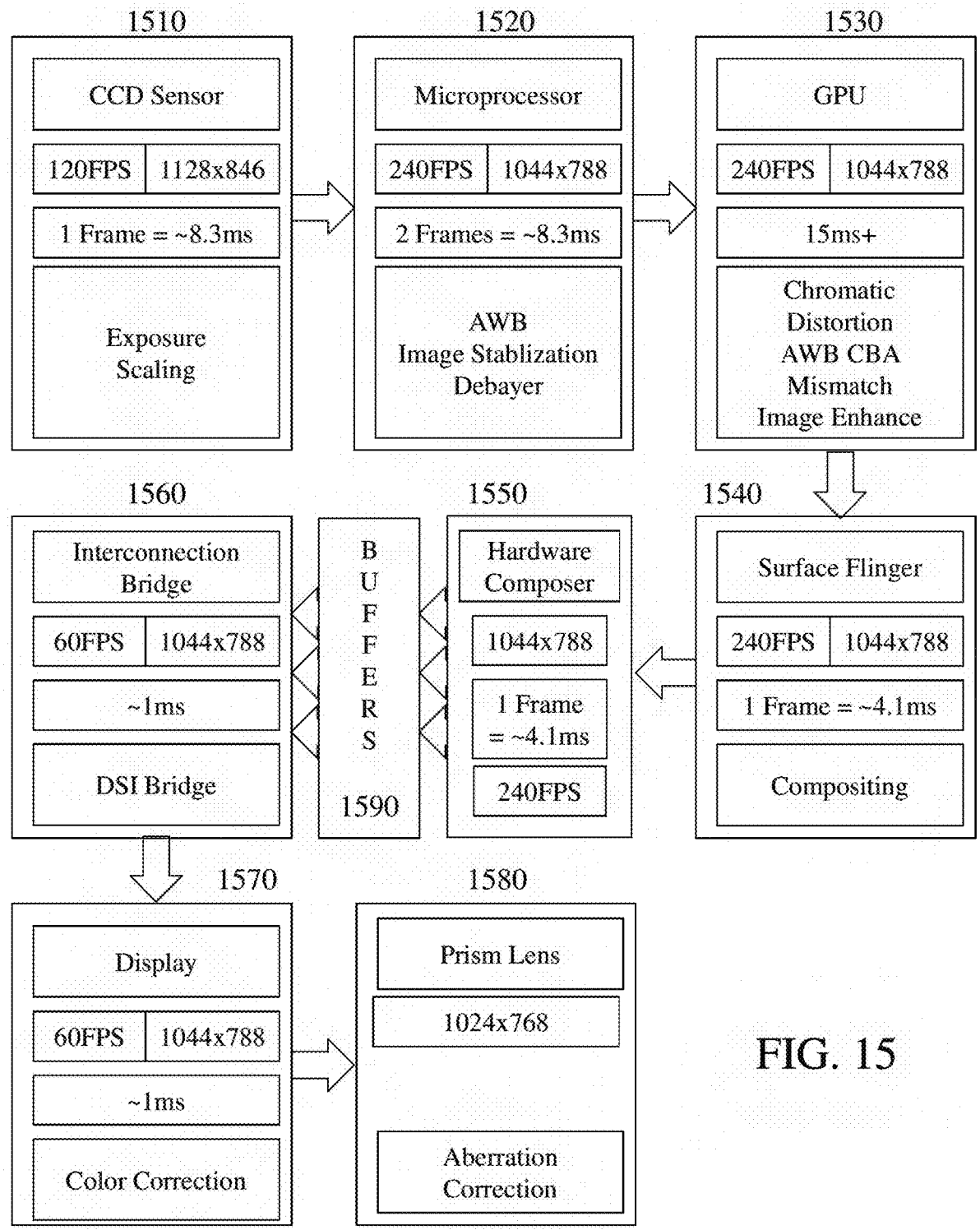
FIG. 15 depicts an exemplary HMD electronics configuration and processing sequence demonstrating parallel low-latency processing.

Referring to FIG. 15 there is depicted an exemplary HMD electronics configuration and processing sequence demonstrating parallel low-latency processing. As depicted the configuration/sequence comprises:

CCD sensor 1510 which captures the visual field of view of the user at a particular pixel dimension (e.g. 1128× 846) and frame rate (e.g. 120 frames per second (FPS));

Microprocessor 1520 which acquires the frames at a rate, e.g. 240 FPS, from the CCD sensor 1510 and performs processing functions such as image stabilization, Debayer process for color recovery from a Bayer filtered CCD array, and automatic white balance (AWB) for example resulting in a processed image at a second dimension, e.g. 1044×788;

Graphic Processing Unit 1530 which acquires frames at 240 FPS and at the second dimension to apply graphical processing functions such as chromatic distortion (as discussed supra and below), automatic white balance, chief ray angle (CRA) correction, and image enhancement etc.;

Surface Flinger 1540 which composites all "image" surfaces such as the captured image and overlay content into a single buffer for display;

Hardware Composer 1550 which acquires content from the surface flinger 1540 and composes it for the display 1570;

Buffers 1590 which as described below provide an ability to manage different frame rates and reduce latency within the processing configuration/sequence;

Interconnection Bridge 1560 which connects the hardware composer 1550 to the display 1570;

Display 1570 which displays the image at its display rate, e.g. 60 FPS as the second dimension, which within embodiments of the invention is a pixel-predistorted image such that the displayed image in conjunction with the prism lens applies color-dependent correction; and Prism Lens 1580 which couples the pixel-predistorted image to the user's pupil resulting in the desired display image at a third dimension, e.g. 1024×768, with aberration correction established by its design.

Accordingly, Table 1 depicts the timing for the HMD electronics configuration and processing sequence.

TABLE 1

HMD Hardware and Processing Latency

| Element | Frame Rate (FPS) | Timing |
|---|---|---|
| CCD Sensor 1510 | 120 | ~8.3 ms |
| Microprocessor 1520 | 240 | ~4.1 ms |
| GPU 1530 | 240 | ~15 ms (1) |
| Surface Flinger 1540 | 240 | ~4.1 ms |
| Hardware Composer 1550 | 240 | ~4.1 ms |

TABLE 1-continued

HMD Hardware and Processing Latency

| Element | Frame Rate (FPS) | Timing |
|---|---|---|
| Interconnection Bridge 1560 | 60 | ~1 ms |
| Display 1570 | 60 | ~1 ms |
| Prism Lens 1580 | — | — |
| | TOTAL | ~37.7 ms |

Note (1):
GPU Processing times may be larger with additional processing applied

As depicted within FIG. 15 a set of buffers, Buffers 1590, are disposed between the Hardware Composer 1550 and Interconnection Bridge 1560. Within an embodiment of the invention Buffers 1590 may comprise three buffers, which are referred to as a "display" buffer, a "fill" buffer, and a "next fill" buffer, These Buffers 1590 are accessed by the Hardware Composer 1550 and Interconnection Bridge 1560 respectively according to a standard process. Accordingly, the Interconnection Bridge 1570 accesses the "display" buffer in order to provide the information for the Display 1570 whilst the Hardware Composer 1550 fills the "fill" buffer. When the Display 1570 via the Interconnection Bridge 1560 has read from the "display" buffer it moves to the "fill" buffer for content to display. The Hardware Composer 1550 when it has filled the "fill" buffer moves to filling the "next fill" buffer. Accordingly, the Hardware Composer 1550 and Interconnection Bridge 1560 may within an embodiment of the invention, where the Hardware Composer 1550 and Interconnection Bridge 1560 cannot simultaneously access the same buffer to write/read, sequentially access the three buffers in a round-robin format such that the Hardware Composer 1550 is filling the next buffer or buffer plus one that the Interconnection Bridge 1560 will access to push the data to the Display 1570. As depicted in FIG. 15 with typical hardware configurations frame rates processed by the Hardware Composer 1560 and hence written to the Buffers 1590 are higher than the read frame rate by the Interconnection Bridge 1560 to the Display 1570. Because of the reduction in frame rate at this interface, the image is less "stale" than if the input and output frame rates been equal.

If we consider that the Display 1570 provides or is provided with a frame synchronization signal, VSync then within the exemplary configuration depicted in FIG. 15 with a fast front-end and slow back-end then the HMD acquires frames at a high rate from the CCD Sensor 1510 and processes these through the front end and into the Buffers 1590. The Display 1570 has a lower frame rate and reads from the Buffers 1570. Receipt or generation of VSync results in the display acquiring the most recent frame stored into the Buffers. In this configuration the Hardware Composer 1560 may have filled a first buffer and then filled a second buffer wherein the VSync is acquired/generated such that the Display 1570 via the Interconnection Bridge 1560 now reads from the second buffer and the first buffer is now over-written by the Hardware Composer 1560.

Accordingly, it would be evident that whilst a processing/ hardware pipeline such as depicted in FIG. 15 may generally be operated in a manner with fixed frame rates at the CCD Sensor 1510 and the display with a synchronized operation through the pipeline that within other embodiments of the invention asynchronous operation and/or different frame rates may be employed. For example, the Display 1570 may be disposed with a circuit operating with a different clock to that of the Hardware Composer 1550 and Buffers 1590. Alternatively, the CCD Sensor 1510 may clocked with a different clock to the Hardware Composer 1560 and Buffers 1590 or the CCD Sensor 1510, Display 1570 and different partitions of the intermediate pipeline may be operating from different clocks. Such a scenario may occur where the Display 1570, CCD Sensor 1510 and intermediate pipeline are three different wearable devices. However, in this scenario or alternatively wherein they are in a single wearable such as the HMD then by staggering VSync in this stage and associated synchronization signals in other stages the pipeline can be configured such that the process does not need to wait for a full frame to be processed before beginning the next stage in the pipeline. In this manner latency may, based upon the frame rates and elements within the pipeline, be reduced through staggered synchronization signaling within the pipeline.

Within an alternate embodiment of the pipeline the Buffers 1590 is just the "display" buffer. In this configuration the Display 1570 reads from the buffers 1590 via the Interconnection Bridge 1560 but the Hardware Composer 1550 (or any other element writing to the Buffers 1590) does so directly without consideration of synchronisation. Whilst further reducing latency within the pipeline this can create what the inventors refer to as "image tearing" as the Display 1570 may now be displaying part of one frame with part of another.

Within a further embodiment of the invention where the Hardware Composer 1550 etc. are faster at writing to a buffer within the Buffers 1590 then the buffer may be, according to appropriate hardware selection, be concurrently written to by the Hardware Composer 1550 and read from via the Interconnection Bridge 1560 as we know the Buffer 1590 will fill faster than it is emptied. In this configuration as a buffer within the Buffers 1590 is filled a threshold capacity is reached at which it is safe to start reading from the buffer. A similar threshold may be used if the Buffer 1590 is read faster than it is filled in that the threshold denotes the point at which the time to read the buffer is still sufficient for the remaining fill operation to complete.

Figure 16:
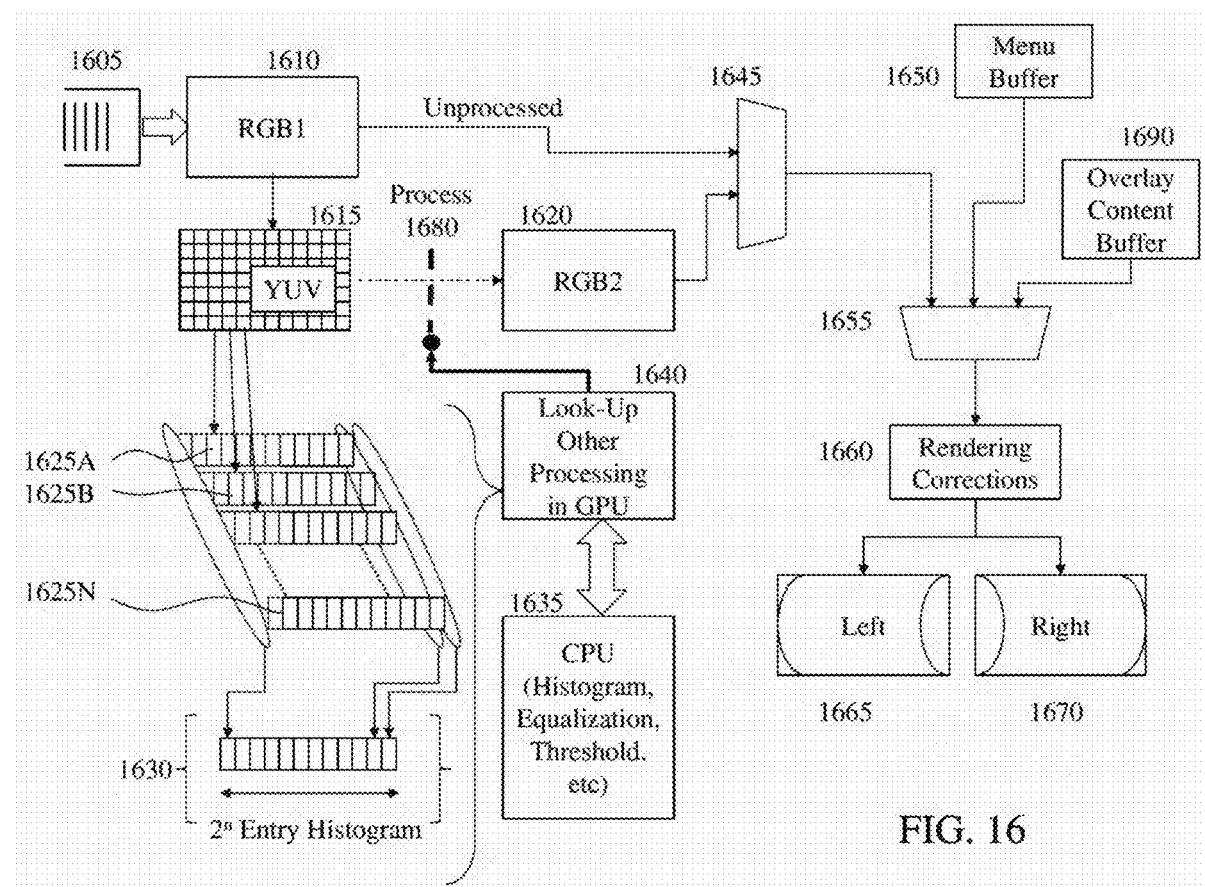
FIG. 16 depicts schematically image processing steps executed within an HMD according to an embodiment of the invention exploiting parallel histogram processing.

Now referring to FIG. 16 there is depicted schematically the image processing steps executed within an HMD according to an embodiment of the invention exploiting parallel histogram processing. Within the embodiment depicted and as described supra in respect of FIG. 15 the HMD exploits system-on-a-chip (SOC) technology combining graphics and central processors, GPUs and CPUs, respectively, together with video image I/O subsystems, direct memory access (DMA) and memory controllers. However, as outlined below embodiments of the invention may exploit different architectures with varying combinations of hardware-software-firmware and integrated versus hybrid and/or discrete circuits. As depicted within FIG. 16 an acquired image frame, e.g. from a CCD sensor associated with the HMD, a CCD sensor, or an external source such as a video feed, cable TV feed, Internet website, etc. is acquired (image data 1605). This is then stored by DMA into an RGB buffer (RGB1 1610). If this image is to be employed directly without any processing, e.g. the user is using an HMD for vision augmentation or the vision augmentation alternately displays processed/unprocessed images then the content from RGB1 1610 is coupled via first and second combiners 1645 and 1655 to rendering process corrections 1660 (as discussed supra in FIG. 15) before being displayed to the left and/or right eyes 1665 and 1670 respectively.

Second combiner 1665 also receives in addition to the signals coupled from the first combiner 1645 the control data from a menu buffer 1650. Menu buffer 1650 may provide content overlay, text overlay, video-in-image, content-in-image features to a user as well as control/function menu displays for the user. First combiner 1645 also receives in addition to the content from RGB1 1610 the content from a second RGB buffer (RGB2 buffer 1620). The content within RGB2 1620 being generated by applied by process 1680 to content within a YUV buffer 1615 which is established in dependence upon the content within RGB1 1610 (YUV being a color space to which the RGB additive color space is mapped wherein Y represents brightness and U/V components denote the color.) Within embodiments of the invention data based upon histograms of the image data 1605 are useful for several functions such as image histogram for equalization or thresholding for binarization such as described below in respect of FIG. 17.

However, this histogram data must be generated with low latency. Accordingly, within an embodiment of the invention the data within the YUV buffer 1615 is processed by tessellating it for processing in parallel within the GPU. Accordingly, a separate GPU processing thread within a GPU processor 1640 is assigned to each segment, each of which compute a local histogram of their segment of the image data in parallel, depicted as first to $N^{th}$ histogram bin arrays 1625A, 1625B to 1625N. After local computation, each bin of the histogram is then summed, again in parallel, with a GPU processor 1640 thread now assigned to each bin, as opposed to each image segment, in order to compute the overall image histogram. This being depicted by Entry Histogram 1630 which comprises $2^N$ entries as YUV image data is typically binary-encoded. However, other configurations may be employed. This histogram is then communicated to a general-purpose CPU 1635 for processing, which might include additional functions such as described below in respect of FIG. 17 as well as others. Subsequent to the decision-making and non-parallelizable functions being computed in the CPU 1635, it returns to the GPU 1640 for lookup or mapping functions to be performed as the image data is reconverted from YUV to RGB format as process 1680.

By employing the parallel multiple GPU processor threads and or multiple GPU processors in two orthogonal directions in two consecutive passes across the histogram data array parallel use of resources is maximized without memory contention, and histogram-computation latency is minimized. Employing the CPU 1635 within the processing loop, a processor better suited to portions of the process, such as the generation of a histogram-equalization mapping function as shown in FIG. 17, which then returns the resulting function to the GPU 1640 for execution, further result in parallel resource use being maximized and latency minimized.

As depicted in FIG. 16 the processed data (from RGB2 1640) or unprocessed image data (from RGB1 1610) selected by first combiner 1645 is then composited with any device display image data, such as that for menu items and prompts, retrieved from Overlay Content Buffer 1690. While in general this device-display data may be presented in any way, including fully replacing the processed or unprocessed image data, it may be preferred to have this information overlaid on said image. This is achieved within an embodiment of the invention by using the layering functions of Open Graphics Library (OpenGL) which is a cross-language, cross-platform application programming interface (API) for rendering 2D and 3D vector graphics. This is achieved by specifying "alpha=0" for all pixels in the menu buffer, and sending both images for rendering and aberration-correction. The display sub-system may exhibit a non-uniform distortion characteristic, in which case two separate renderings may be required, one to compensate for each of the two prismatic characteristics.

Figure 17:
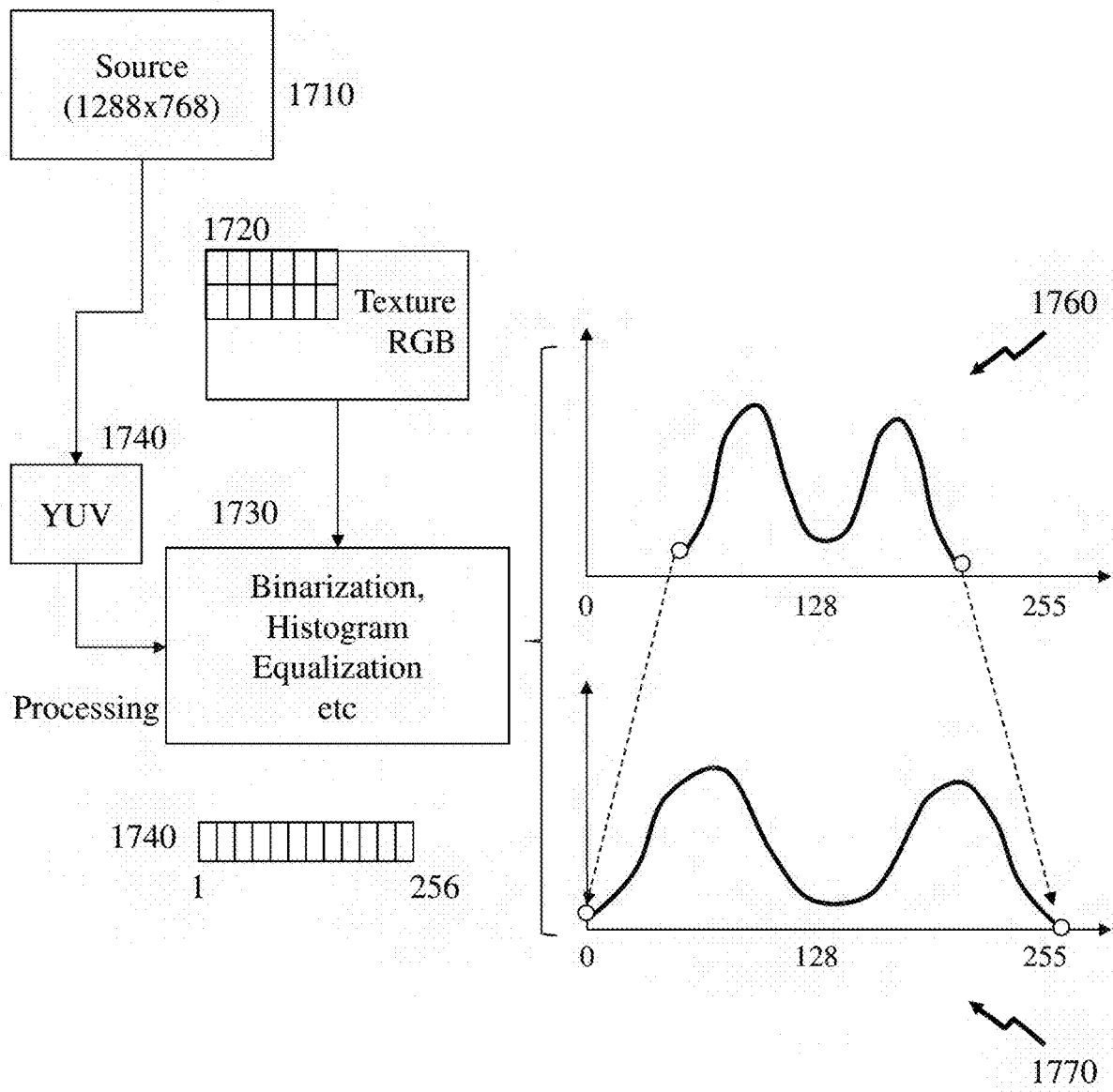
FIG. 17 depicts image histogram equalization and thresholding for binarization.

Referring to FIG. 17 image histogram equalization and thresholding for binarization is depicted starting with a source image 1710 which is then converted to YUV data as described supra in respect of FIG. 16 and stored within YUV buffer 1740 before being employed in conjunction with Texture RGB data 1720 within the processing step 1730 wherein binarization, histogram generation, and equalization are performed. Texture RGB data 1720 is stored according to the characteristics of the HMD optical train and is generated through a process such as that described supra in respect of FIG. 14A. Accordingly, the pixel data employed in the generation of the binned histogram data and their subsequent processing are not continuous samples within the image but rather the mapped pixels based upon the texture map(s). Accordingly, the acquired image data may be processed such that an initial histogram 1760 is equalized as depicted in second histogram 1770.

6. Image Pipeline

Figure 18:
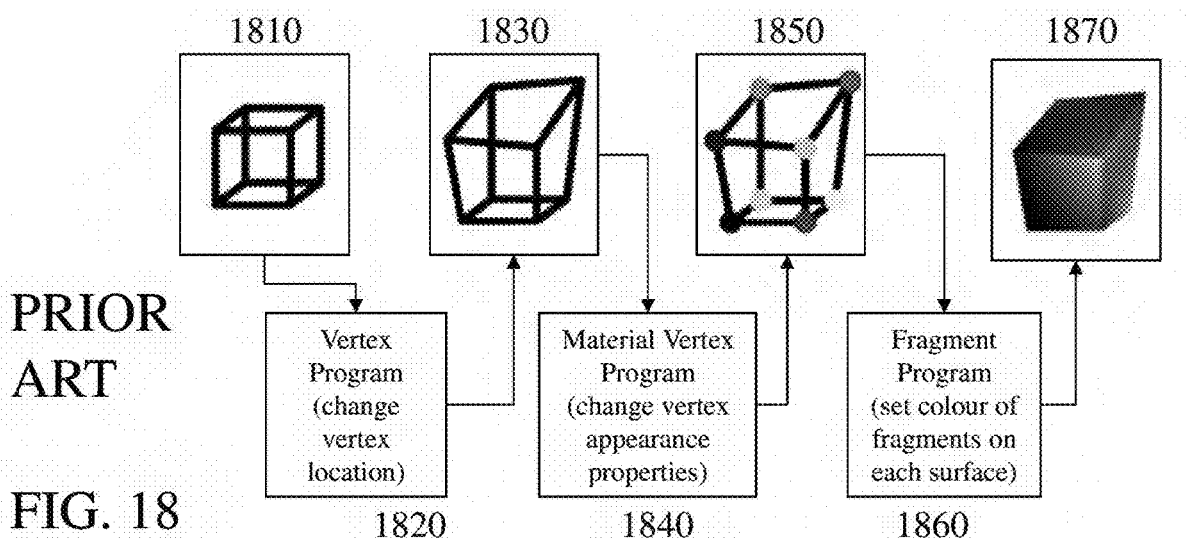
FIGS. 18 to 20 depicts prior art image processing pipelines.

Within an embodiment of the invention a GPU and CPU cooperate in image processing using a commercial or open-source graphics language API such as OpenGL. This combination of graphics hardware and software is designed for use in modeling objects in multiple dimensions and rendering their images for display and has over time been optimized, enhanced etc. for gaming applications etc. with low latency. Accordingly, the inventors have exploited such an architecture as depicted in FIG. 6 with GPU 1640 and CPU 1635 within an HMD architecture according to an embodiment of the invention. The prior art processes for a two-dimensional rendering of a three-dimensional cube are shown in FIG. 18. Initially, the vertices of an element are defined in step 1810 before being transformed by a Vertex Program in step 1820, e.g. to reflect view point, motion, etc. of an object being rendered within the virtual environment. As such the vertices of the cube are transformed in 3-space according to perspective in vertex processing yielding transformed element 1830. Next a Material Vertex Program adjusts the appearance properties of the vertices in step 1840 yielded an element with vertex properties in step 1850. Such properties being colour and intensity for example. Subsequently, the element is fragmented in step 1860 with Fragment Program to generate a series of fragments which are rendered to form the displayed element. In this process the fragment properties are interpolated from the vertex properties and the resulting object 1870 rendered.

Figure 19:
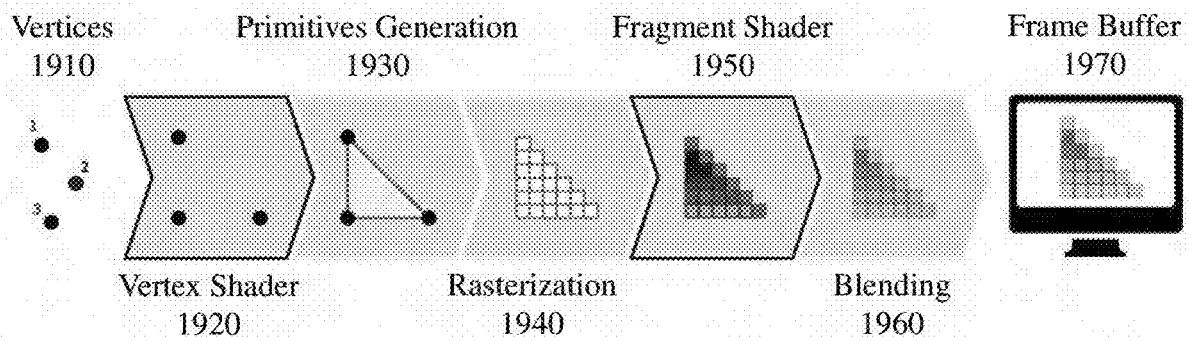
Figure 20:
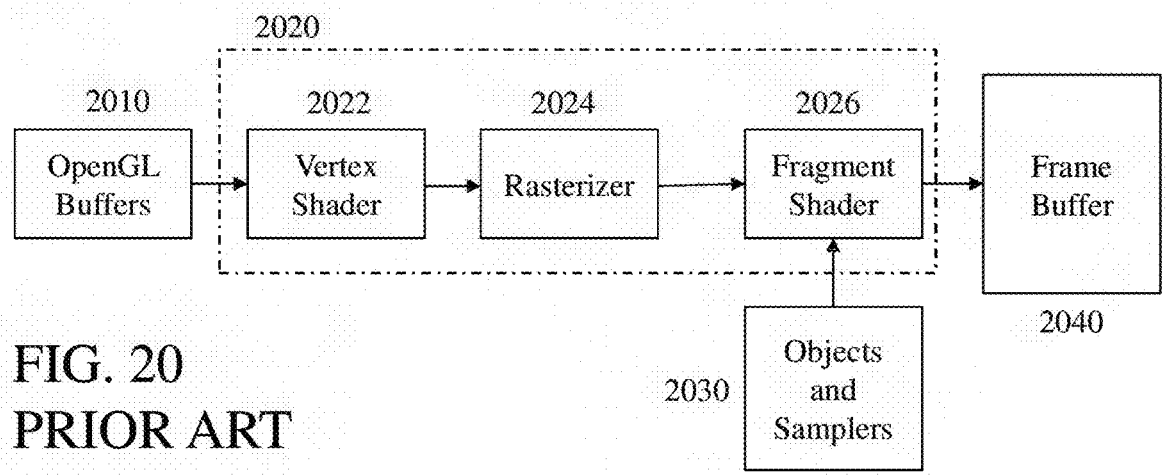

An alternate two-dimensional (2D) example is shown in FIG. 19, showing the steps of vertex definition 1910, vertex shading 1920, primitives generation 1930, rasterization 1940, fragment shading 1950, and blending 1960 wherein the resultant image data is depicted within a frame buffer 1970. Within these prior art uses of GPU processing spatial mapping is performed early in the processing pipeline in the vertex operations, whilst colour assignment is later within the pipeline within the fragment shader. This is evident from the simplified view of an OpenGL image pipeline in FIG. 20 wherein the Vertex Shader 2022, Rasterizer 2024, and Fragment Shader 2026 are functions within the GPU 2020. Accordingly, the GPU receives data from OpenGL buffers 2010, processes it and provides it to Frame Buffer 2040. As such the Fragment Shader 2026 provides for not only shading (colouring) of the fragments but it is also where other characteristics of the element known as textures may be mapped to the image fragments.

Accordingly, within embodiments of the invention established and implemented by the inventors this OpenGL process has been applied to the problem of removing chromatic aberrations from an image being presented to a user with an HMD. As noted supra in respect to the issues of chromatic aberration from the prism lens of the HMD it is desirable to be able to perform separate spatial transformations independently for each of the R, G, and B components of the image for the purpose of correcting distortion and chromatic aberration, CRA and other effects yet still be able to use commercially-available hardware and both commercial and open-source graphics-processing software.

Figure 14B:
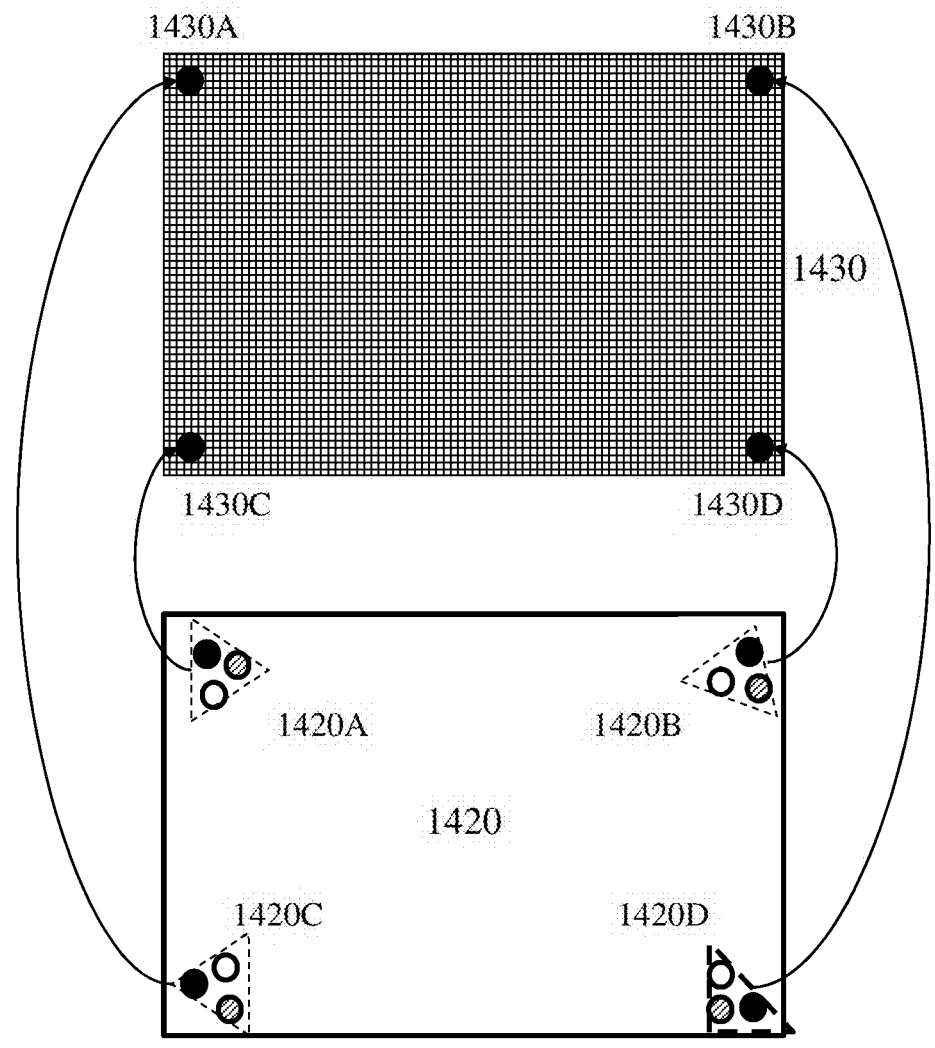
Figures 21, 22:
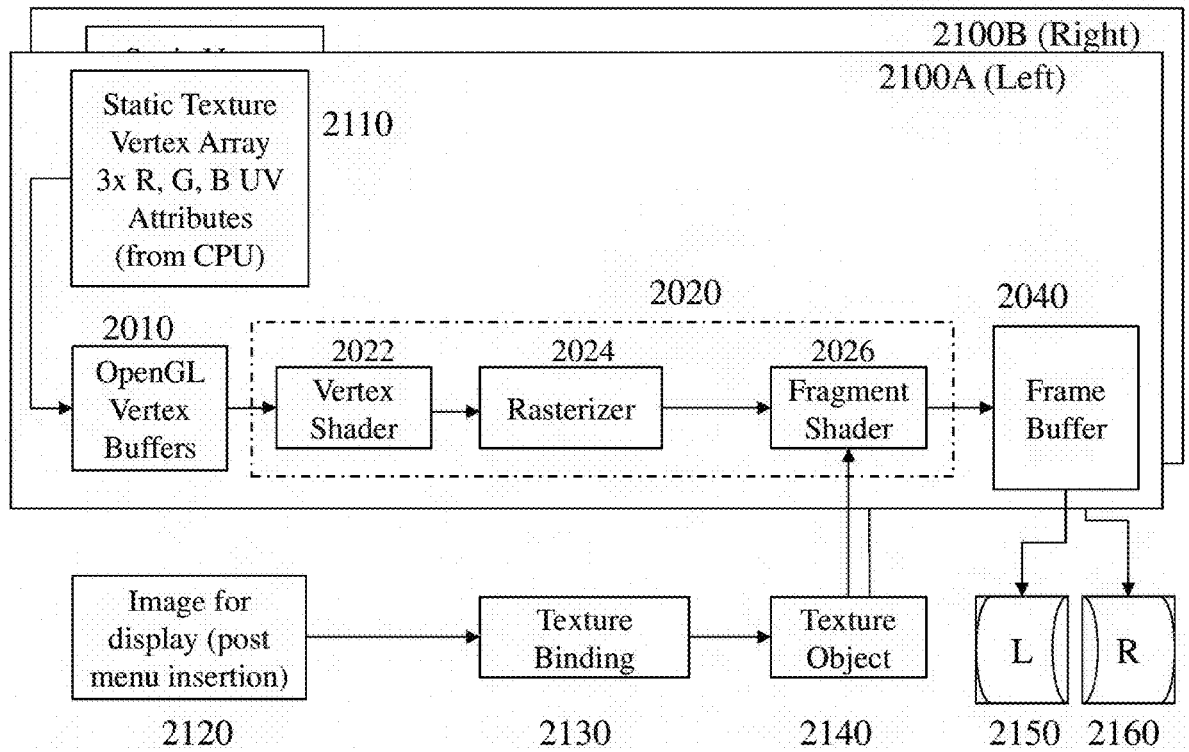
FIG. 21 depicts a mapping of the functions of a prior art OpenGL image processing pipeline within the image processing system of an HMD exploiting an embodiment of the invention.
FIG. 22 depicts example code for mapping the image processing flow of an embodiment of the invention to an OpenGL image processing pipeline.

However, these prior art pipelines within GPUs whilst programmable in some aspects are rigid in other aspects. One of these rigid aspects is that the vertex spatial transformation precedes colouring and is colour-agnostic. Colour is computed later in the pipeline. Accordingly, the inventors have established an image pipeline as depicted in FIG. 21 to address this issue exploiting the concepts discussed supra in respect of FIGS. 13, 14A and 14B. Referring back to FIG. 13 the reference image with pixels 1310A through 1310D is also the desired image to be seen by the user. The distortion effect of the prism on red, green, and blue light is depicted by R, G, and B images 1330R, 1330G, and 1330B respectively. Accordingly, as depicted in FIG. 14B the problem to be solved is how to create a pre-distorted image 1420 that compensates for the subsequent prism distortions such that pre-distorted each pixel grouping of R, G, and B pixels is mapped to the same location at the user s pupil. This being shown in FIG. 14B as each pixel grouping 1420A through to 1420D being mapped to a pupil location 1430A to 1430D respectively. Whilst the concept of pixel pre-distortion as established by the inventors addresses the chromatic aberration arising from the prism lens between the display and user's pupil within an HMD according to embodiments of the invention it would also be evident that the methodology also applies to any spatial distortions introduced by the prism lens. Accordingly, the inventors in addition to pixel pre-distortion refer to the inventive method as Spatial Distortion and Chromatic Aberration Correction (SDCAC).

Accordingly, in order to implement SDCAC the HMD graphics processing is required to apply three 2D colour-dependent spatial transforms but the GPU has just one spatial-transform engine which is colour agnostic, in the vertex shader. It would be apparent to one of skill in the art that we could use the vertex shader three separate times on the reference image, using different transform-defining vector-arrays for R, G, and B for each of the three executions respectively. The unneeded BG, RB, and RG information being discarded to form red, green, and blue images which are the component values of the required pre-compensated image, which after distortion is displayed and viewed by the HMD user who then sees spatially- and chromatically-accurate image as illustrated in FIG. 14A. However, this requires that the process employ three pipeline executions. Further, it requires that the inverse-map of the display sub-system be computed, where typically only the forward-map is computed, as it is needed for display optics design. Further, if separate compensation transforms are required for left and right images, this overhead is doubled.

Accordingly, the inventors established an alternate approach as depicted in FIG. 21 which only exploits a single GPU processing pipeline pass per image, as opposed to per-color. This is achieved by applying what essentially amounts to an identity transform within the Vertex Shader 2022 of the GPU 2020 and accomplishing the colour-dependent spatial transforms in a portion of the pipeline not traditionally used for the task, namely the Fragment Shader 2026. The approach is described in terms of an OpenGL language methodology but the approach is generic.

During system initialization the CPU, not shown for clarity, prepares an OpenGL3.0 Vertex buffer 2010 using a Static vertex buffer 2110. Within the embodiment of the invention rather than a single texture attribute and UV indices for that texture there are three texture attributes, namely R, G, and B, each with its own associated UV(R), UV(G), and UV(B) texture-coordinates. The vertex locations are defined in a regular GPU based 2D tesselation covering the image area, although many different tessellations/tilings are possible within the scope of the invention. For each vertex, the CPU writes to each of the R, G, and B texture attributes the 2D point in UV(R), UV(G), and UV(B) respectively, from the forward coordinate-transform of the display subsystem. These locations are shown in FIG. 12, by way of example, although the original regular vertices and fragment-edges themselves are not shown. After the OpenGL buffer has been prepared it is passed to the GPU and the image processing pipeline applied to generate the processed data for the Frame Buffer 2040.

Within the GPU no spatial transformation of the regular tessellation of the screen area is applied, but the Vertex Shader 2022 does pass the pre-computed UV(R), UV(G), and UV(B) forward-transform coordinates through the pipeline to subsequent stages. Accordingly, a completely regular and undistorted tessellation is delivered through rasterization to the Fragment Shader 2026. Accordingly, as processed or unprocessed image data arrives in frames from the camera subsystem or other sources 2120, it is converted to a texture and bound to the Fragment Shader 2026 as shown in 2130, 2140. A single texture and regular sampler is used, though two executions of the pipeline may be required for distinct left and right images. Alternatively, left and right images may be processed as depicted with first and second OpenGL flows 2100A and 2100B respectively in FIG. 21 which are both provided with the Texture Object 2140 and respectively each present the processed data to a display associated with their respective eye.

An OpenGL code section is presented in FIG. 22. The separate RGB forward coordinate-maps are passed from vertexShader to fragmentShader through vTexCoordRed, vTexCoordGreen, and vTexCoordBlue. The fragmentShader does three texture lookups to different locations in the texture as specified by the passed UV(R), UV(G), and UV(B) for the R, G, and B respectively. Consider the operation of this OpenGL code operating on pixels near the bottom-left edge of a display screen as shown in FIG. 12 by the expanded insert of the bottom left corner. The forward-transform is shown where white light at the lower left display edge, denoted by the dots, is passed though the display it will arrive at coordinates shown in R, G, B by the respective tessellated patterns. The fragmentShader processes a pixel from a vertex at the left edge which has UV(R), UV(G), and UV(B) coordinate attributes set when the OpenGL buffer was created by the CPU. Accordingly, the vertex with its blue coordinate shifted furthest right, green less so, and red the least right are shifted relative to their intended position. The fragmentShader reads the texture memory, which holds the desired display image data, at, in this example but not exclusively, these three different locations of the image to select the R, G, and B values to be written to the frame buffer's left-edge pixels. The fragmentShader essentially asks: "what pixel colours shall I draw at these left-edge pixel locations?", and by using the forward-transform into the reference image mapped as a single texture object, is able to answer: "the pixel-colours that need to be sent from here so that the user perceives an undistorted image, i.e. those values contained in the texture locations shown dashed in the FIG. 12 insert". The triple-inverse mapping method of FIGS. 13 and 14 is improved upon.

For simplicity corresponding code for Chief Ray Angle (CRA) and other chromatic corrections is not shown within the code segment in FIG. 22 but would be evident to one of skill in the art. Additional vertex attributes may be added for other corrections such as amplitude correction for example, via gain values for R, G, and B pixels respectively. In a similar manner these may be passed forward through the vertexShader to be applied as multipliers in the final colour assignment in fragmentShader.

The colour-dependent spatial transforms and spatially-dependent amplitude transforms that are required for compensation are thus implemented by the fragmentShader and not the vertexShader as within the prior art. Accordingly, the inventors inventive method allows exploitation of a prior art graphics pipeline, such as OpenGL on SOC technology, in order to correct for a variety of unwanted chromatic and distortion effects within an optical system displaying real time images to the user within an HMD or other similar environment.

7. Chief Ray Angle and Image Sensor Chromatic Compensation

Figure 23:
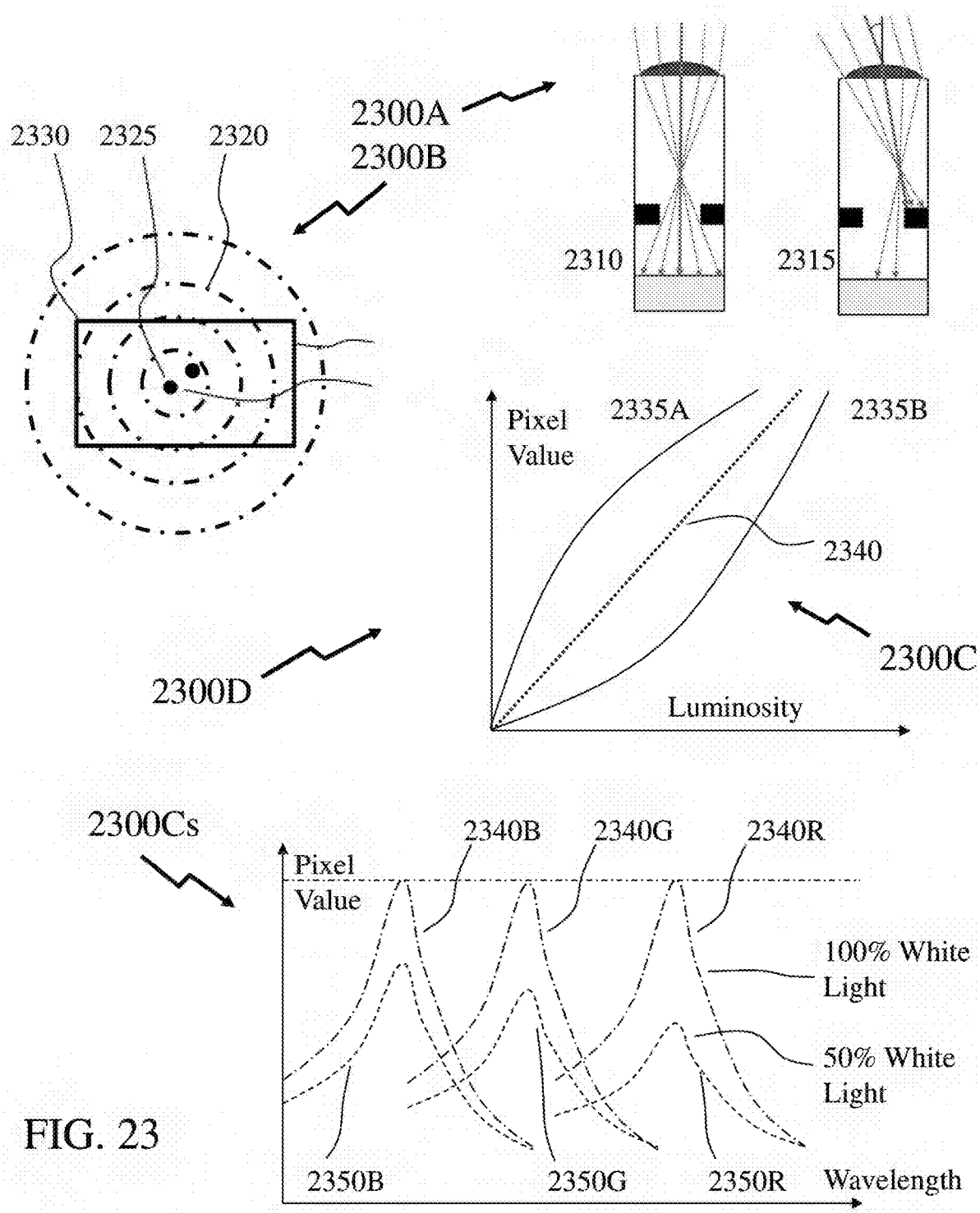
FIG. 23 depicts the considerations of Chief Ray Angle (CRA) on the image processing according to an embodiment of the invention.

Within embodiments of the invention wherein the original image source is a camera or image sensor, then there may be distortion and/or other chromatic effects that may require compensation. Among these is the Chief Ray Angle (CRA) effect as depicted in FIG. 23 by first image 2300 and first and second schematics 2310 and 2315. As CCD and other CMOS detectors are typically planar integrated circuits with the active absorber disposed some depth into the circuit with imperfect micro-lenses, intervening metallization traces etc. then it is common for such devices to exhibit CRA wherein as the incident source of illumination moves of-axis (e.g. from first schematic 2310 to second schematic 2315) then the uncompensated pixel response decreases as the CRA angle increases. For circular sensor pixels then the CRA reduction at a fixed radius from the sensor centre is constant and this reduction increases with increasing radius. However, as depicted in second image 2300B with a rectangular pixel 2330 the CRA of the incident light 2325 should experience a CRA reduction at constant radius 2320 but the spot will in some directions fall off the sensor whilst still being on it in other directions.

Further, as depicted schematically in third and fourth images 2300C and 2300D respectively each pixel colour may possess a different response characteristic. Accordingly, referring to third image 2300C each colour pixel, e.g. red, green, and blue, may exhibit a particular response when illuminated with 100% pure white light as depicted by first spectral plots 2340B, 2340G, and 2340R respectively. However, at 50% illumination with white light these may exhibit different responses as depicted with second spectral plots 2350B, 2350G, and 2350R respectively. Accordingly, rather than a linear pixel response with luminosity as depicted by linear slope 2340 in fourth image 2300D then a varying CRA correction factor would be required such as depicted by first and second non-linear plots 2335A and 2335B respectively. Accordingly, the sensor data requires a correction depending upon both the angle and intensity of the incident illumination. Accordingly, this image chromatic and spatial characteristic must also be corrected for within the images presented to the user in order not to distort their colour perception of their field of view. The required corrections may vary according therefore according to the manufacturer and design of the sensor acquiring the image data.

Figure 24:
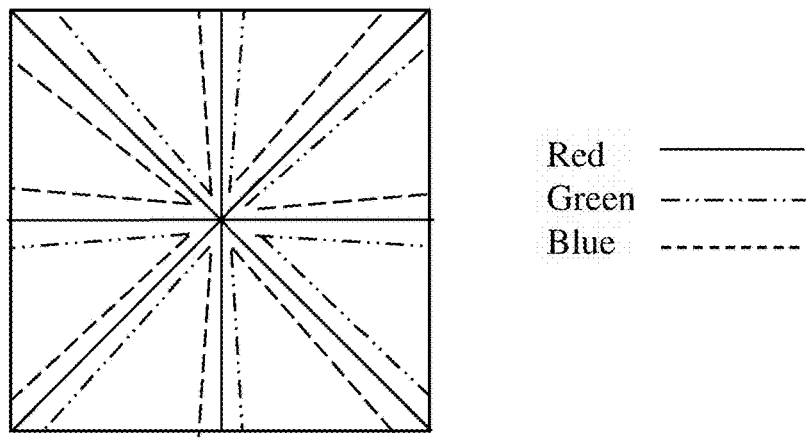
FIG. 24 depicts an example of a calibration image for an HMD system according to an embodiment of the invention.

Whilst it is possible to pre-compute all the required compensations, as they simply the inverse of effects, whether CRA or pixel-response non-linearity or another, and compose those corrective functions without requiring calibration, it is also possible to alternately or in addition to calibrate the image-acquisition compensation sub-system through the use of one or more chromatic-compensation test images. Such a chromatic test pattern is depicted in FIG. 24 with horizontal, vertical and diagonal lines of one colour, e.g. red, together with additional lines for green and blue. It would be evident that multiple designs of rectangular, circular, or other shape may be employed or that multiple test patterns may be employed such as one per colour. Such testing can be fast and low impact through an automated test and calibration system for a HMD. In such cases light of known intensity within each of the pixel-response curves may be applied as a reference and the required compensation determined directly through measurement of the non-uniform response. This measured compensation may then be stored in non-volatile memory and later applied in real-time along with any other image processing such as for correction of display subsystem chromatic aberration in order to render an improved image to the user than had such compensation not been applied. Unlike display prism compensation, CRA compensation may vary according to zoom, focus, and other effects.

8. Sensor, Display and Effective Visual Frames

Figure 25:
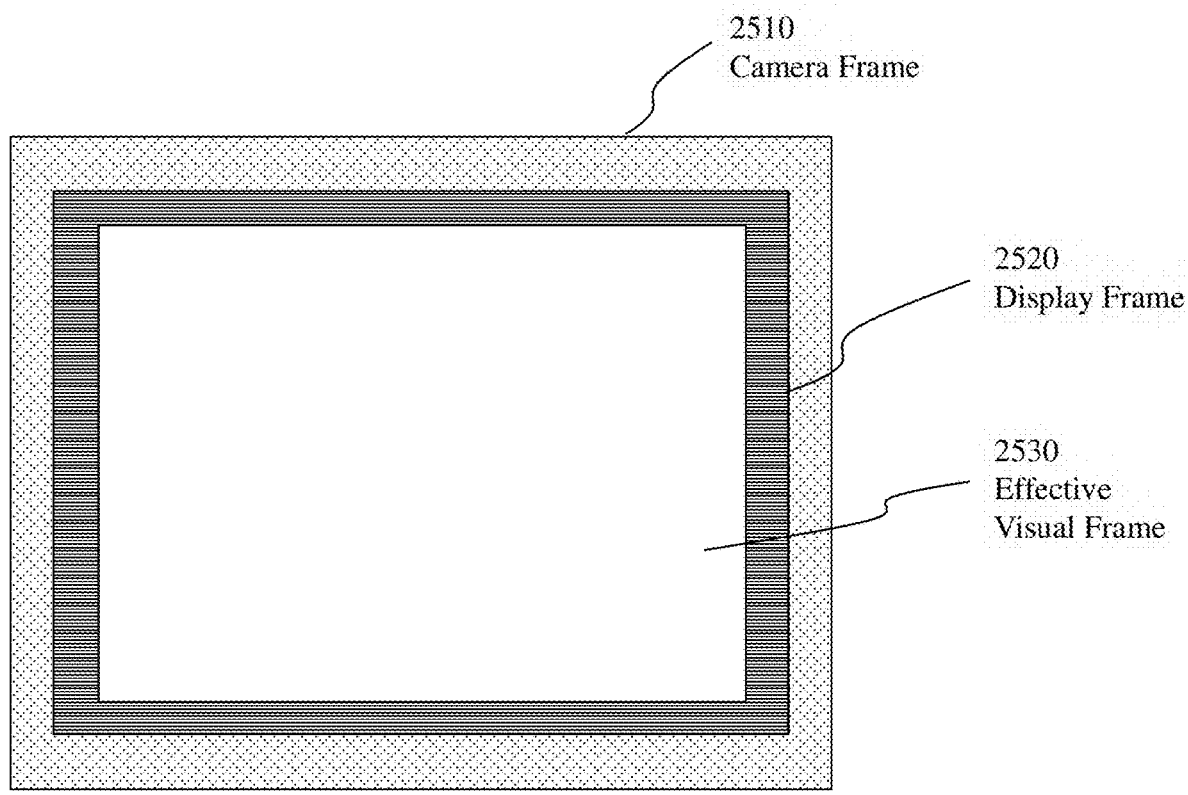
FIG. 25 depicts exemplary buffers applied to a displayed image for stabilization and optical aberration correction to define the imaging sensor dimensions.

With the methodology described and presented supra in respect of pixel pre-distortion or Spatial Distortion and Chromatic Aberration Correction (SDCAC) it is evident that the display dimensions may be different from the effective visual frame presented to the user such that the pre-distortion effect can be implemented. Accordingly, this is depicted in FIG. 25 wherein an effective visual field 2530 of 1024× 768 pixels is presented to the user but the display frame 2520 is 1044×788 as an offset up to 10 pixels per edge is employed for the pixel pre-distortion. However, as evident from FIG. 25 the camera frame 2510 is not equal to the display frame but rather is larger at 1128×846 wherein a buffer of 42 pixels per edge laterally and 29 pixels per edge vertically are provided. Accordingly, limited motion of the camera may be removed, if required, by sampling different display frames each frame based upon data derived either from the acquired field of view and/or motion sensors associated with the camera or the HMD if the camera is integral to the HMD, such data being used to perform a frame-by-frame coordinate-mapping so as to reduce perceived motion.

9. HMD Display Formats and Electronic File Formats

Figure 26:
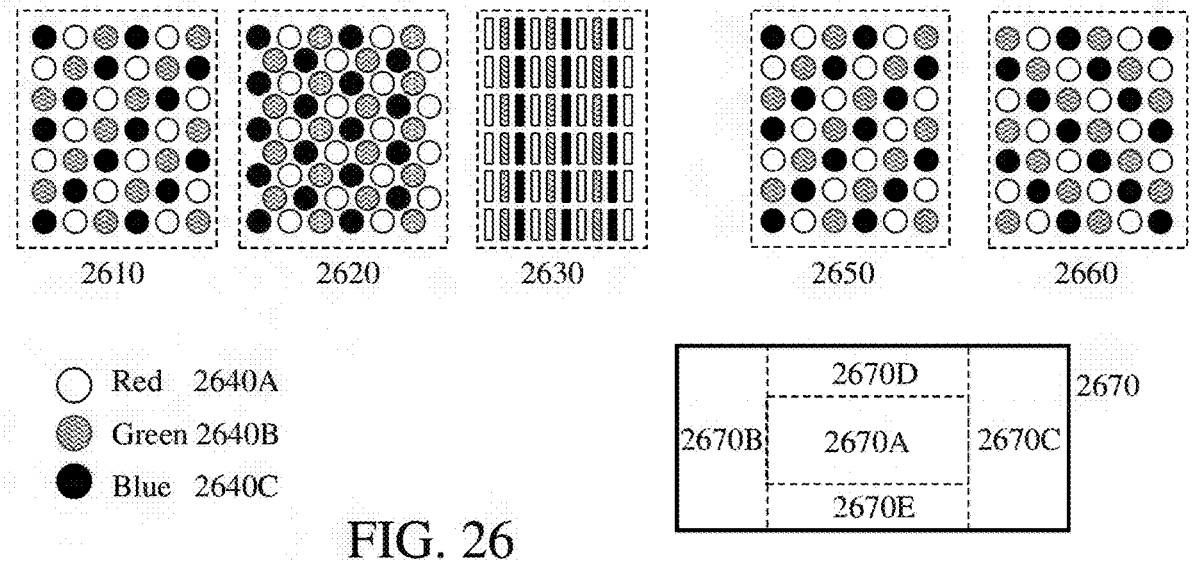
FIG. 26 depicts standard display pixel configurations together with variable pixel dimension display according to an embodiment of the invention.

Referring to FIG. 26 there are presented first to third standard pixel patterns 2610 through 2630 for displays such as LED-backlit LCD, Active Matrix LCD (AMLCD), Thin-Film Transistor LCD (TFT-LCD), Plasma, and Active Matrix Organic LED (AMOLED). Accordingly, each of the first to third standard pixel patterns 2610 through 2630 comprises a regular pattern of Red (R) 2640A, Green (G) 2640B, and Blue (B) 2640C pixels which may be of a predetermined geometric shape such as circular, rectangular, square although other shapes may in principle be employed. Such displays being commonly referred to as RGB displays. In some instances, to increase display brightness a White (W) pixel may be included in the repeating pattern to form a RGBW display.

Also depicted within FIG. 26 is display 2670 comprising a central region 2670A which employs a first display pixel pattern 2650 surrounded by first to fourth edge regions 2670B through 2670E respectively which employ a second standard pixel pattern 2660. As shown by first display segment 2655A in first display pixel pattern 2650 the pixels are disposed in accordance with first standard pixel pattern 2610 for example. Second display segment 2655B, which covers the same physical display area first display segment 2655A, is shown in second display pixel pattern 2660 and shows that the pixels are disposed within the same configuration as those within the first display pixel pattern 2650 but now that the colour sequence of the pixels has been modified. In first display segment 2655A the upper row runs BRGBRG whilst in the second display segment 2655B the upper row now runs GRBGRB. Accordingly, the first to fourth edge regions 2670B through 2670E may exploit different pixel patterns to reduce the chromatic dispersion as for example at high angular offset the red and blue pixels are offset in the reverse of the dispersion introduced by the optical prism such that the resulting combination is reduced.

It would be evident to one skilled in the art that the pixels within central region 2670A may be implemented according to one of the standard patterns such as first to third standard pixel patterns 2610 through 2630 for example and the first to fourth edge regions 2670B through 2670E to have the same pattern but with modified pixel sequence. Alternatively, the edge regions may be implemented with different pixel geometries to that of the central region and may further be implemented for example with different pixel geometries within first and second edge regions 2670B and 2670C respectively to that within third and fourth edge regions 2670C and 2670D respectively to reflect their projection onto the patient's retina. Optionally, for example if the pixels were of a linear geometry such as third standard pixel pattern 2630 then the orientation may be varied within the first to fourth edge regions 2670B through 2670E in a manner that they vary essentially radially within the display 2670.

Figure 27:
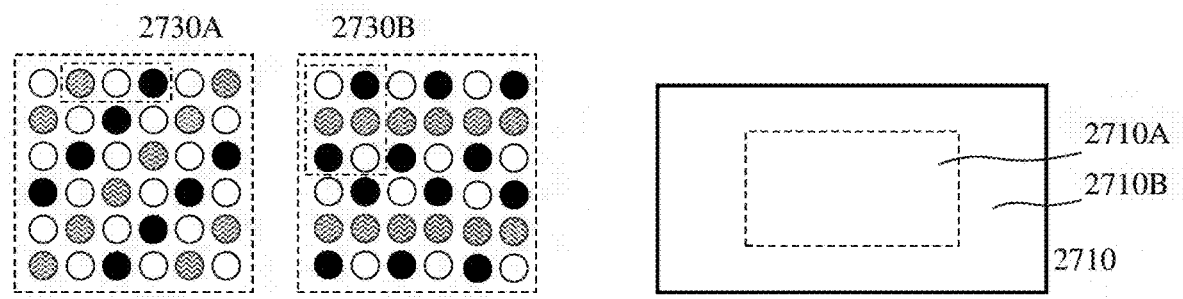
FIG. 27 depicts a variable pixel dimension display according to an embodiment of the invention.

Referring to FIG. 27 there is depicted a display 2710 comprising first and second regions 2710A and 2710B respectively comprising R, G, and B pixels 2640A through 2640C respectively in first and second pixel configurations 2730A and 2730B respectively. Accordingly, as shown within each of the first and second regions 2710A and 2710B respectively the basic configuration of the pixels remains constant as does their size but the sequence of the pixels varies. Within the first region 2710A the basic repeating pattern is GRB which repeats in the next row offset by a pixel each time. However, within second region 2710B the basic repeating pattern is split across 3 rows with R(1)B(1), G(1)G(2), B(2)R(2). Accordingly, in the upper portion of the display 2710 the pixels active for a displayed pixel may be R(1), G(1), B(2) whilst in the lower portion of the display 2710 the pixels active for a displayed pixel may be B(1), G(1), R(2). Accordingly, the activated pixels within a display pixel may be adjusted according to the freeform prism dispersion such that the display offsets pixels illuminated based upon the dispersion. As also evident from other discussion and consideration below distortion may be similarly addressed through the techniques and variants of the techniques described with respect to chromatic dispersion.

Figure 28:
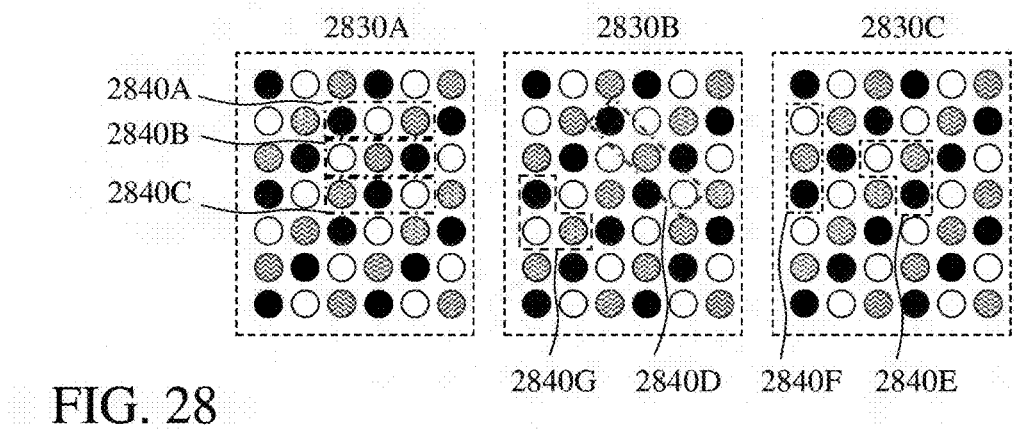
FIG. 28 depicts a variable pixel dimension display according to an embodiment of the invention.

Referring to FIG. 28 there is depicted a display 2810 comprising first and second regions 2810A and 2810B respectively comprising R, G, and B pixels 2640A through 2640C respectively in first to third pixel configurations 2830A through 2830C respectively. Accordingly, as shown within each of the first to third pixel configurations 2830A through 2830C respectively the basic configuration and size of the pixels remains constant. In first pixel configuration 2830A first to third pixels 2840A to 2840C are depicted each comprising three pixels, one each of R, G, and B such as found within the central region 2710A of the display 2710 in FIG. 27. However, in second and third pixel configuration 2830B and 2830C respectively as employed in second region 2810B the pixel configuration is effectively that given by fourth and fifth pixels 2840D and 2840E respectively in the upper and lower portions of second region 2710B of the display 2710 in FIG. 27. Alternatively, sixth pixel 2840F may be employed instead of third pixel 2840E and seventh pixel 2840G may be employed instead of fourth pixel 2840D. Fourth pixel 2840D is established using the B from first pixel 2840A, G from second pixel 2840B and R from third pixel 2840C. Similarly, fifth pixel 2840E is established using the R and G from first pixel 2840A, and the B from third pixel 2840C. In this manner the relative positions of the R, G, B pixels are shifted. In order to generate these the image may be simply processed such that for fourth pixel 2840D, for example, the B content from second pixel 2840B is used to drive B in the first pixel 2840A, R from second pixel 2840B is used to drive the R in the third pixel 2840C, and the G is unmodified.

In this manner the modification of the image to account for the CHRODISMAP is through the separation of each pixel into the requisite R, G, B signals and then re-combining these back in different combinations with the extracted R, G, B signals from other pixels. Now referring to FIG. 29 there is depicted an exemplary flow chart 2900 for a HMD according to an embodiment of the invention. As shown the process begins in step 2905 with the initialization of the HMD wherein the process proceeds to step 2910 and image data is acquired from the camera wherein the process proceeds to step 2915 wherein a determination is made as to whether the process is employing a single image file process or multiple image files. If the determination is multiple image files then the process proceeds to process flow 3000 as described below in respect of FIG. 30 otherwise it proceeds to step 2920 wherein a determination is made as to whether full mapping of the image data is to be employed or whether partial mapping is employed. If full mapping, the process proceeds to step 2930 otherwise the process proceeds similarly to step 2930 but via step 2925 wherein the portions of the image that will not be presented are nulled.

In step 2930 the data file relating to the display structure is retrieved followed by the retrieval of a display aberration file in step 2960 defining aberration data including, but not limited to, the CHRODISMAP. For example, the aberration data may be chromatic aberration and distortion. Optionally, a single file may be employed or alternatively multiple files may be defined and combined when required according to the processing flow, power requirements etc. These are then used in step 2935 to format the received image data to the display structure. For example, a display such as described supra in respect of FIG. 27 wherein the pixel has multiple colour pixels of each colour and determines which colour pixels to apply the modified image pixel data to such as described in respect of FIG. 27 to offset the colour pixels to account for the data within the CHRODISMAP used in conjunction with display structure data to provide the modified image data. Alternatively, with a display such as described supra in respect of FIG. 28 the image data may be weighted spectrally to adjust the effective spectral content to the regions of the display. It would be evident that the formatting may comprise multiple such aspects based upon the display. Subsequently a determination is made in step

2965 as to whether the modified image data requires modification for the user's visual perception, i.e. does the modified image data require processing for visual perception issues of the user or not. If not, the process proceeds to step 2950 otherwise it proceeds to step 2940 wherein the user (patient) calibration data is retrieved from memory and applied in step 2945 to adjust the formatted image data to adjust the image content to reflect the visual perception deficiency of the user of the HMD.

Next in step 2950 the processed formatted image data is passed to the display controller wherein the resulting data is displayed to the user in step 2955 and the process loops back to step 2910 to retrieve the next image data. Similarly, where process flow 2900 directs to process flow 3000 in step 2910 this process flow 3000 similarly returns to step 2910. Optionally, the steps within process flow 2900 may be pipelined within a processor such that for example image data relating to one image is being processed in step 2935 whilst image data relating to another image is being processed in step 2945. Such pipelining for example allowing reduced latency in presenting the modified formatted image data to the user. Nulling data that is not to be processed reduces the amount of processing required. It would be evident to one skilled in the art that alternatively the region to be processed is processed via a reduced dimension image data file that essentially crops the captured image to that portion which will be processed.

Figure 29:
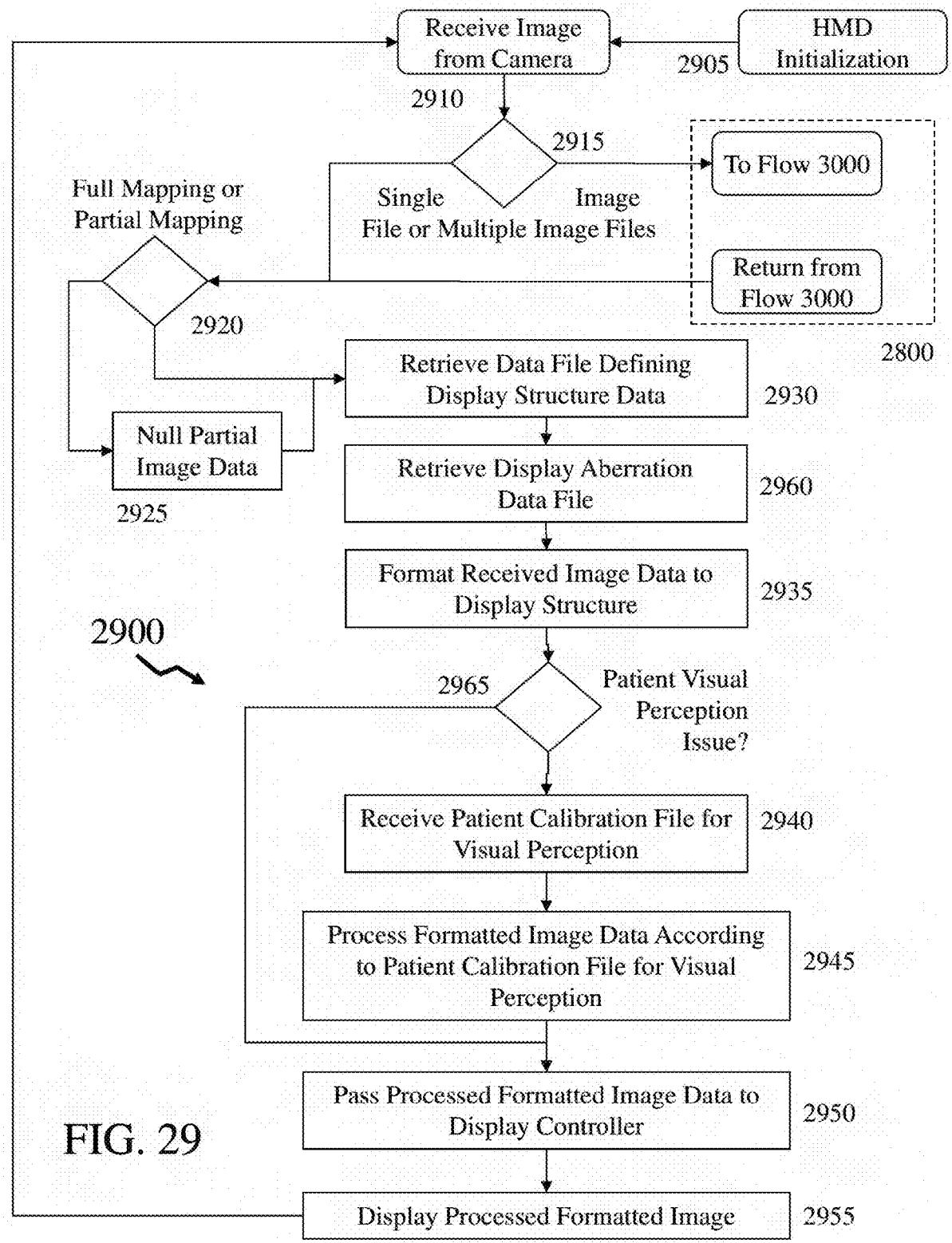
FIG. 29 depicts an exemplary process flow relating to producing an image file according to a predetermined format supporting a head-worn or spectacle mounted display according to an embodiment of the invention.

It would be evident that, the sequence displayed in FIG. 29 may be modified such that, for example, the received image data is initially modified in dependence of any user (patient) related requirements, i.e. steps 2940 and 2945, before being processed for display structure and display aberrations, i.e. steps 2930,2960, and 2935 and then processed for display.

Figure 30:
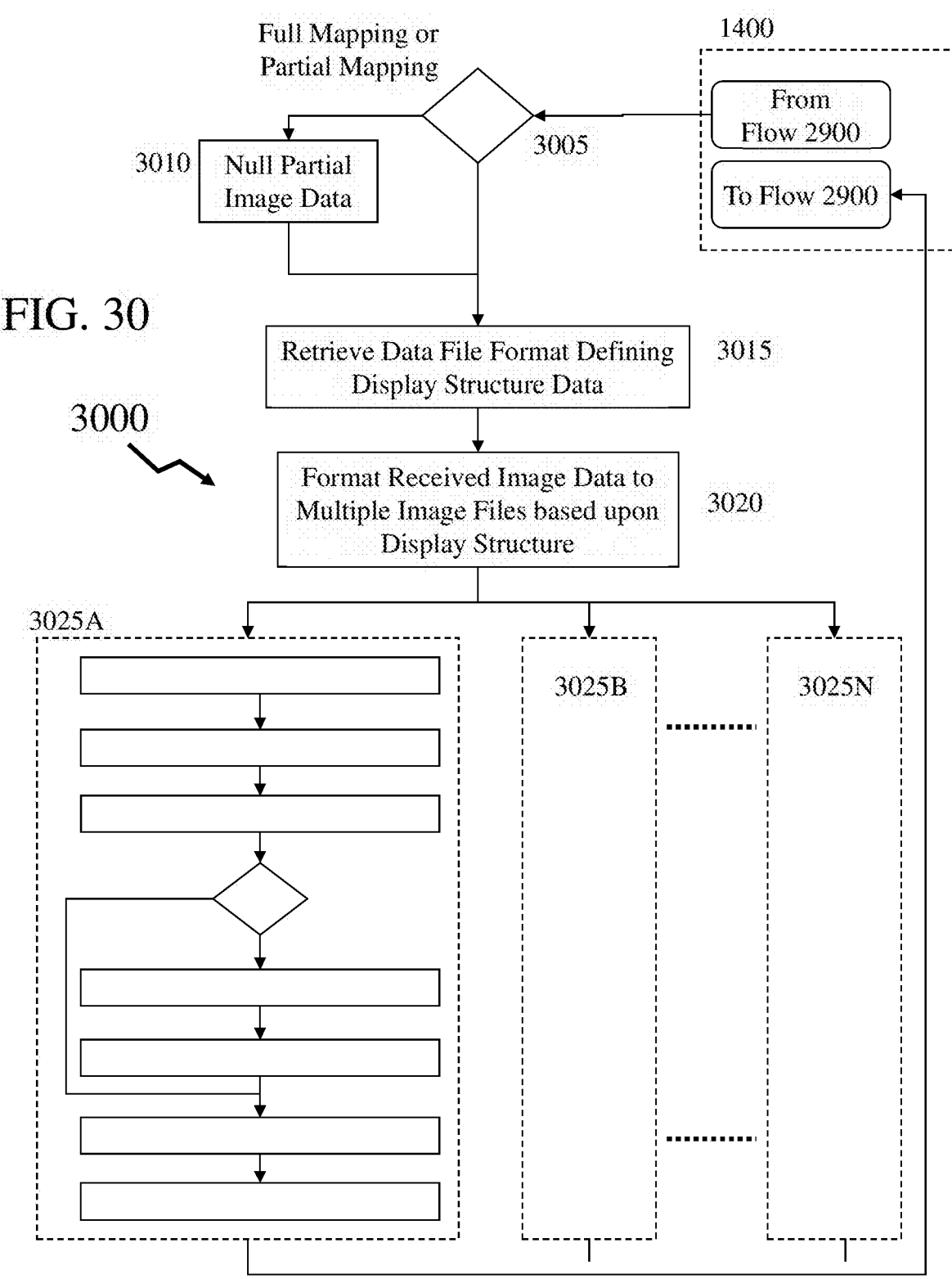
FIG. 30 depicts an exemplary process flow relating to producing an image file according to a predetermined format supporting a head-worn or spectacle mounted display according to an embodiment of the invention.

Referring to FIG. 30 there is depicted process flow 3000 as indicated above in respect of process flow 2900 in FIG. 29 this process flow is accessed where the processing will employ multiple image files derived from the captured image data. Process flow 3000 begins with step 3005 wherein the process determines whether full or partial mapping is to be performed. If full mapping is to be employed the process flow proceeds to step 3030 otherwise the process proceeds to step 3015 via step 3010 wherein the image data file is processed such that portions of the image that will not be presented are nulled. Next in step 3020 the formatted image data file is split into multiple image files in dependence upon the display structure. For example, referring to FIG. 27 the image file is split into three files representing the image content within the first to third regions 2710A to 2710C respectively. Each separate image file is then processed according to sub-process flows 3025A through 3025N wherein each sub-process flow 3025A through 3025N comprising process steps 2930-2955 and 2960-2965 as described in FIG. 29 with respect to process flow 2900 wherein the image file is processed according to patient calibration data and displayed to the patient using the HMD.

Figure 31:
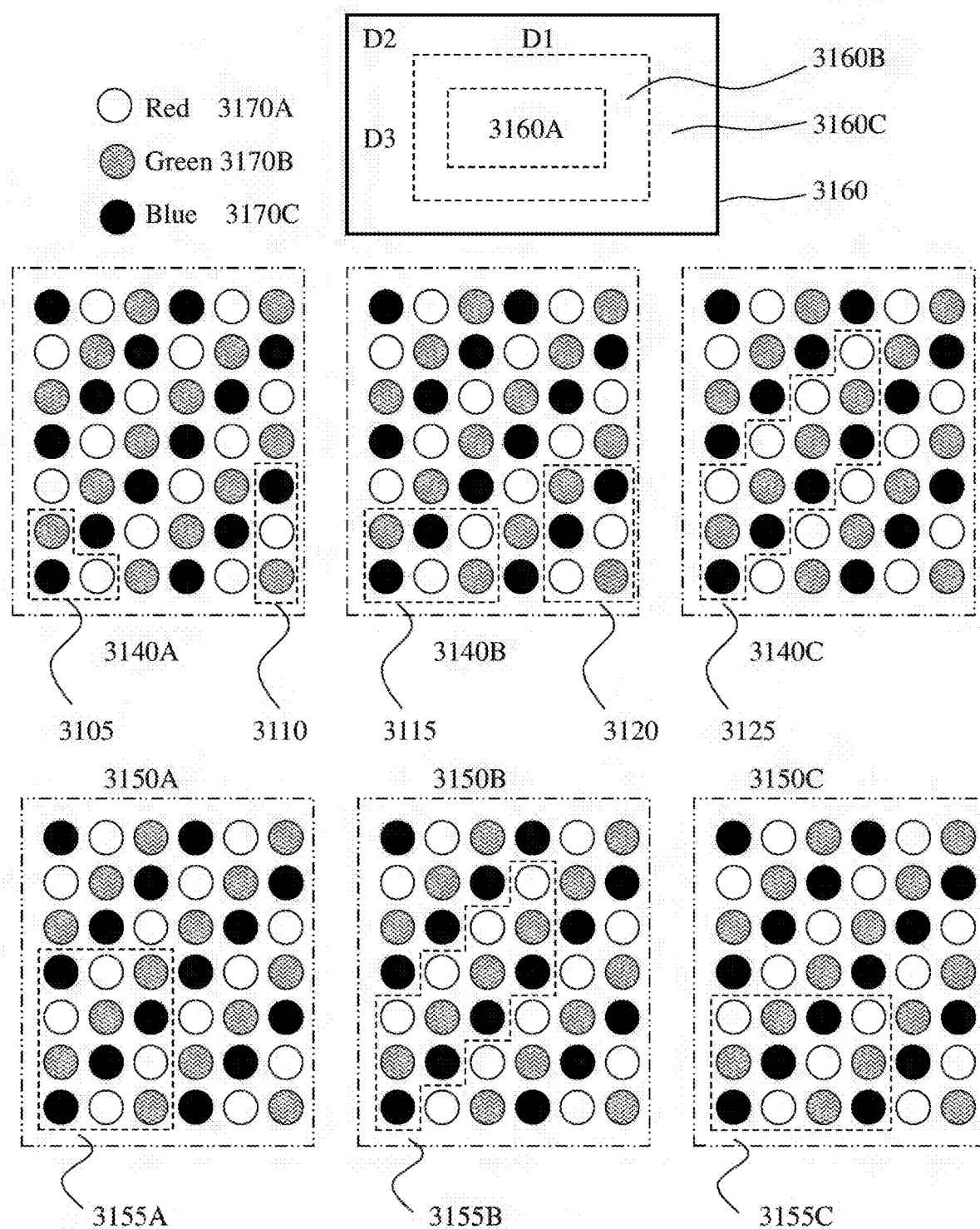
FIG. 31 depicts an exemplary process of providing variable pixel dimension display according to an embodiment of the invention.

Referring to FIG. 31 an alternative display mapping methodology is depicted to provide effective variable pixel dimensions within a display. As described above in respect of FIGS. 26 through 28 respectively display pixel dimensions and layout may be adjusted to accommodate the visual processing characteristics of the human eye particularly where the HMD is exploiting image acquisition for the patient through peripheral and non-central vision due to scotoma or macular degeneration for example. However, non-standard LED/LCD displays may provide a cost barrier to deployment in some scenarios. Accordingly display 3160 within a HMD is structured with three regions being first to third regions 3160A through 3160C respectively wherein each comprises R, G, B pixels 3170A through 3170C respectively.

Within first region 3160A a single image pixel may be configured as first or second pixel pattern 3105 and 3110 respectively comprising one of each of the R, G, B pixels 3170A through 3170C respectively. Within second region 3160B a single image pixel may be configured as third or fourth pixel pattern 3115 and 3120 respectively comprising two of each of the R, G, B pixels 3170A through 3170C respectively. Likewise, third region 3160C is composed of single image pixels which may be configured as fifth pixel pattern 3125 comprising four of each of the R, G, B pixels 3170A through 3170C respectively. Accordingly, the first to third regions 3160A through 3160C respectively are implemented with varying image or effective pixels composed of increasing number of physical pixels, in this instance 1, 2, and 4 pixels of each of the R, G, B pixels 3170A through 3170C respectively.

As depicted in first to third screen sections 3150A through 3150C respectively the effective image pixel varies in each from first pixel combination 3155A through second pixel combination 3155B to third pixel combination 3155C. Each of first to third screen sections 3150A through 3150C being within the third region 3160C of the display 3160 at positions D1 through D3 respectively. It would be evident that similar effective pixel images may optionally be implemented within second region 3160B of display 3160.

Figure 32:
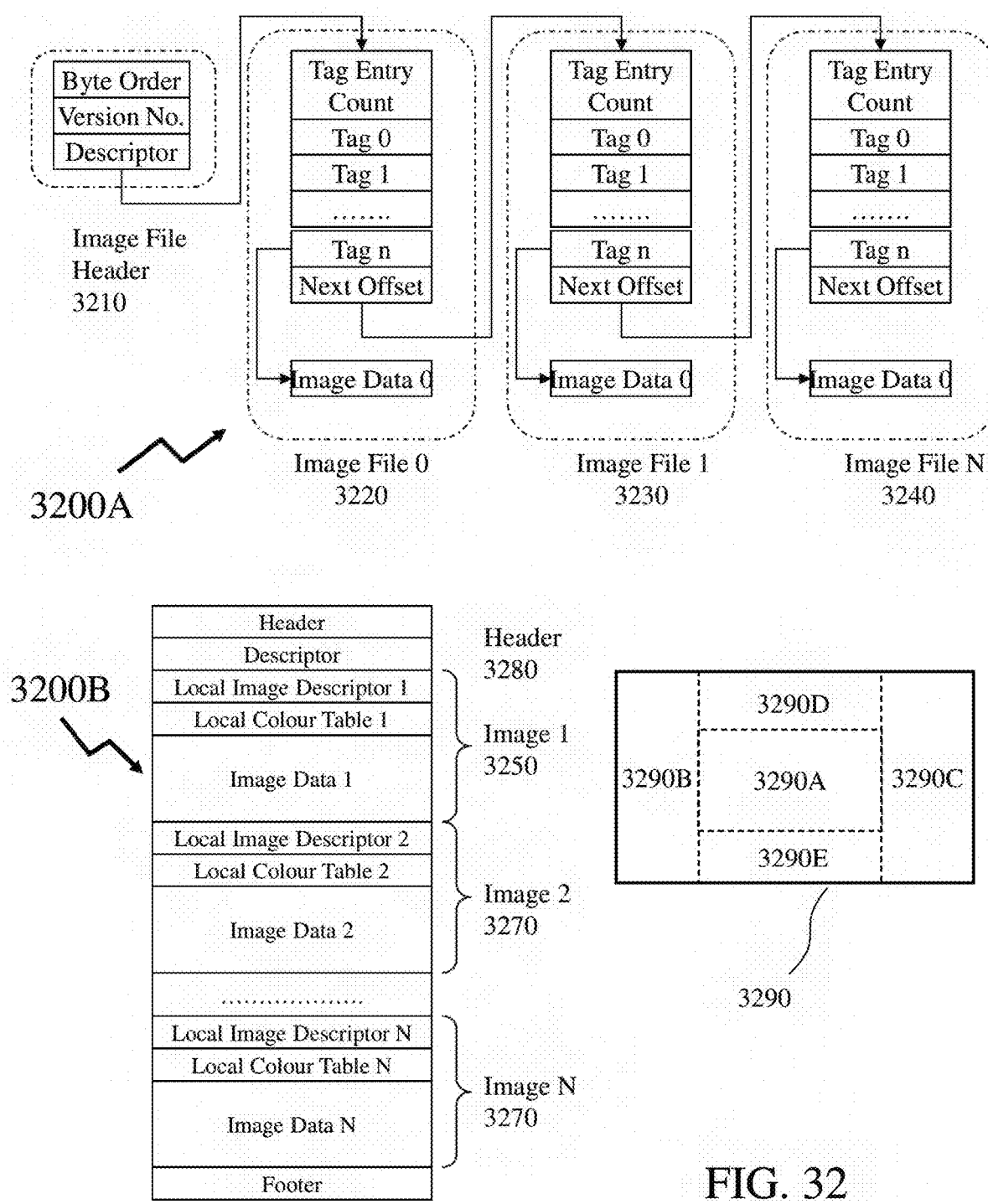
FIG. 32 depicts image file data formats according to embodiments of the invention.

Now referring to FIG. 32 there are depicted first and second file formats 3200A and 3200B relating to storing an image file during processing by a HMD such as described above in respect of FIGS. 29 and 30. Depicted within FIG. 32 is image 3290 comprising central region 3290A and first to fourth regions 3290B through 3290B depicting the mapping of the received image to a display wherein central region 3290A is to be displayed at a first PPI whereas first to fourth regions 3290B through 3290E are to be displayed at a second PPI. Optionally, the different regions may represent image regions which will be provided to the patient in accordance to embodiments of the invention including, but not limited to, those described above in respect of FIGS. 26 through 28.

First file format 3200A depicts a file format wherein image data relating to each display region is stored within a different file allowing processing and manipulation of the data within each to be undertaken in parallel such as described above in respect of FIGS. 29 and 30. Accordingly, an image file header 3210 comprises information relating to the different image files which are depicted as Image File 0 3220, Image File 1 3230 through to Image File N 3240 including a sequence of the image files. Each image file comprises a header which includes reference location of a predecessor file in the set, tag fields which that contains specific information about the bitmapped data within the image file, location of another successor file in the set, and the image data. Accordingly, tag fields within an image file may contain information relating to display characteristics such as spatial or spectral dithering such as presented within U.S. Provisional Patent Application 61/599,996 entitled "An Apparatus and Method for Enhancing Human Visual Performance in a Head Worn Video System" wherein enhanced perception of visual content may be achieved for example by dithering the image spatially or spectrally. Accordingly, rather than transmitting multiple image files to the display and its associated controller this spatial or spectral dithering for example is indicated within the image file header such that the display controller automatically applies them rather than sending sequentially two different files to provide the required dither.

Second file format 3200B represents a single file format according to an embodiment of the invention supporting presenting the image 3290 in multiple portions elements on a display. Accordingly, second file format 3200B comprises an image file header 3280 comprising information relating to the different image files which are depicted as Image 1 3250, Image 2 3260 through to Image N 3270. Each image file, such as for example Image 1 3250, comprises local image descriptor, local colour table, and image data. Local image descriptor may include for example information relating to display characteristics such as spatial or spectral dithering such as described above. Each local colour table may define weighting between R, G, and B pixels to be applied by the display controller to the image file data. Accordingly, aspects of image processing may be distributed between the HMD electronics, whether local or remote in a PED for example, with that associated with the display. For example, setting R=0 within a local colour table may set any R pixel to off irrespective of the actual data within the image data section of the associated image file.

It would be evident to one skilled in the art that exploiting image file formats such as those presented above in respect of FIG. 32 wherein the image file is broken into multiple elements provides for a mechanism for transferring portions of the image asynchronously to other portions of the image. For example, if the processing applied to the image data determines that an object is moving rapidly within one region of the display this image data file may be updated and displayed to the user without waiting for the whole image to be processed. Similarly, presentation of data to a user in black and white may be processed differently to that of colour data for the user. Equally, if the user's visual perceptive issue is colour blindness then this knowledge may be applied and chromatic dispersion aberration processing bypassed or modified as perhaps the blue portion is now removed from the image to be presented, and does not need to be processed.

Figure 33:
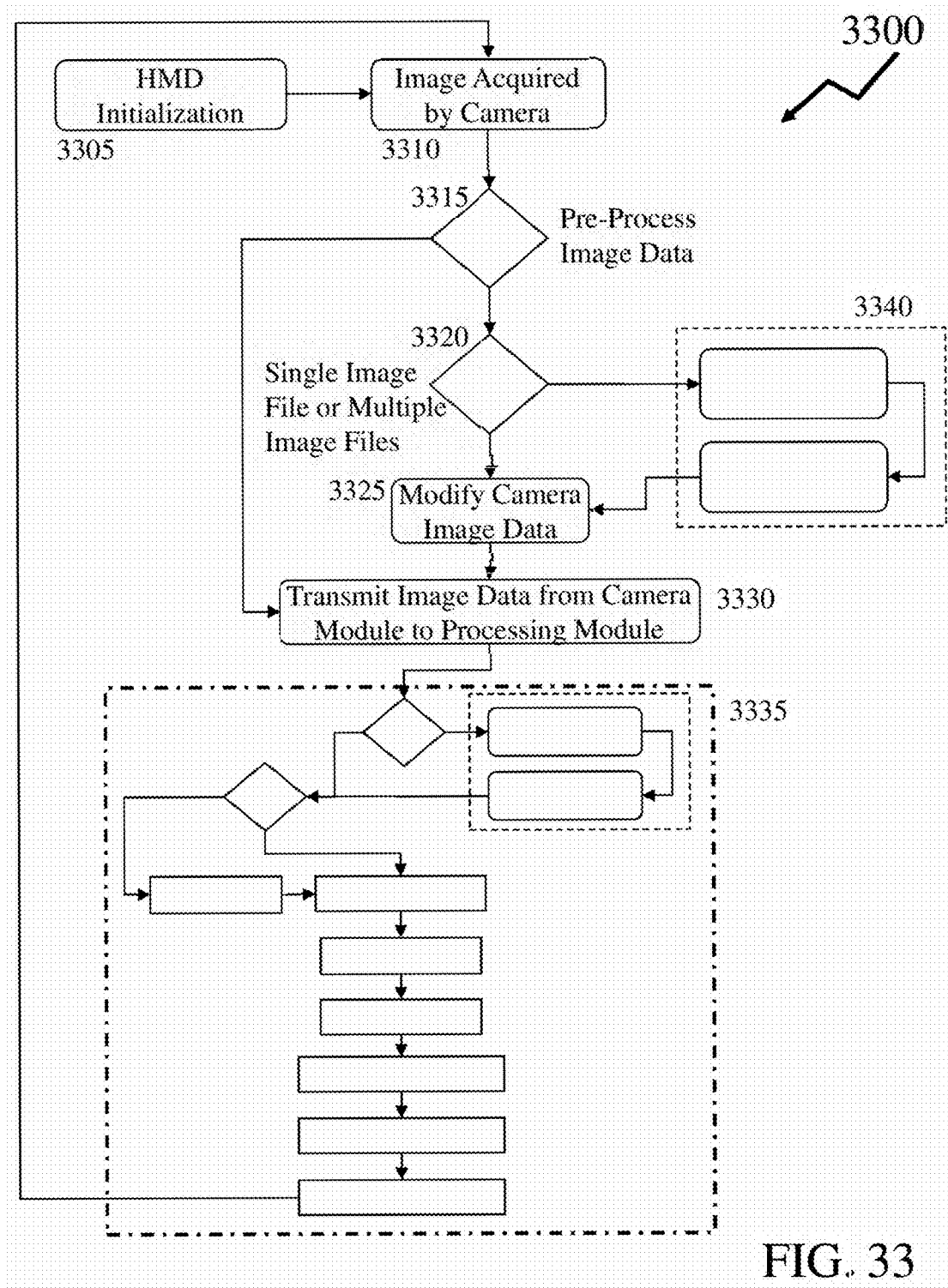
FIG. 33 depicts an exemplary process flow relating to producing an image file according to a predetermined format supporting a head-worn or spectacle mounted display according to an embodiment of the invention.

Now referring to FIG. 33 there is depicted an exemplary flow chart 3300 for a HMD according to an embodiment of the invention. As shown the process begins in step 3305 with the initialization of the HMD wherein the process proceeds to step 3310 and image data is captured by an image sensor, such as for example a camera, wherein the process proceeds to step 3315 wherein a determination is made as to whether the process will pre-process the image data prior to transmitting it to a processing module. If the determination is yes, then the process proceeds to step 3320 otherwise the process proceeds to step 3330. In step 3320 a determination is made as to whether the pre-processing is to be a single image file process or multiple image files. If the determination is multiple image files then the process proceeds to process flow 3340, which may for example be equivalent to process flow 3000 as described below in respect of FIG. 30, and then to process step 3325 otherwise it proceeds to step 3325 directly. Within process step 3325 pre-processing of the image data is performed on the single or multiple image files. Such pre-processing applied to the image data from the image sensor may for example be a reduction or increase in the dynamic range, a color correction, a removal of data relating to a predetermined portion of the user's field of view, removal of data relating to a predetermined portion of the HMD display and/or optical train between HMD display and patient's retina, and applying a predetermined mathematical process.

Within the embodiments of the invention described supra aberration maps, such as chromatic dispersion map, are employed discretely or in combination to provide for electronic aberration correction within a system combining a display, freeform prism, and a user. Within embodiments of the invention a prism viewing area coordinate system may be defined, for example $(x_1; y_1; z_1)$, where for example $z_1$ is fixed to a value relating to the distance from the eye facing surface of the prism to the nominal location of the exit pupil, e.g. $z_1$=21 mm. This coordinate system may be separate to or common with an overall display coordinate system to allow the maps below to be dependent on the prism design or the overall system. A display coordinate system defined by the prism may, for example, allow for different displays to be used with the one prism. Typically, the prism would be designed to the characteristics of the application and the display but it is possible that the prism is designed based upon a generalized display design and then multiple displays may be employed allowing multi-vendor sourcing, component obsolescence, cost reductions etc. to be achieved as common within the development, production and evolution of electronic assemblies. For example, the generic display may be defined by a display coordinate system $(x_2; y_2)$ defined through pixel pattern, pixel pitch and pixel dimensions (e.g. 1024×768 pixels each of size 3.3 μm with RGB pitch 9.9 μm with Sony ECX331 display or 1290×720 pixels each of size 4.0 μm with RGB pitch 12.0 μm with Sony ECX332 display).

Figure 34:
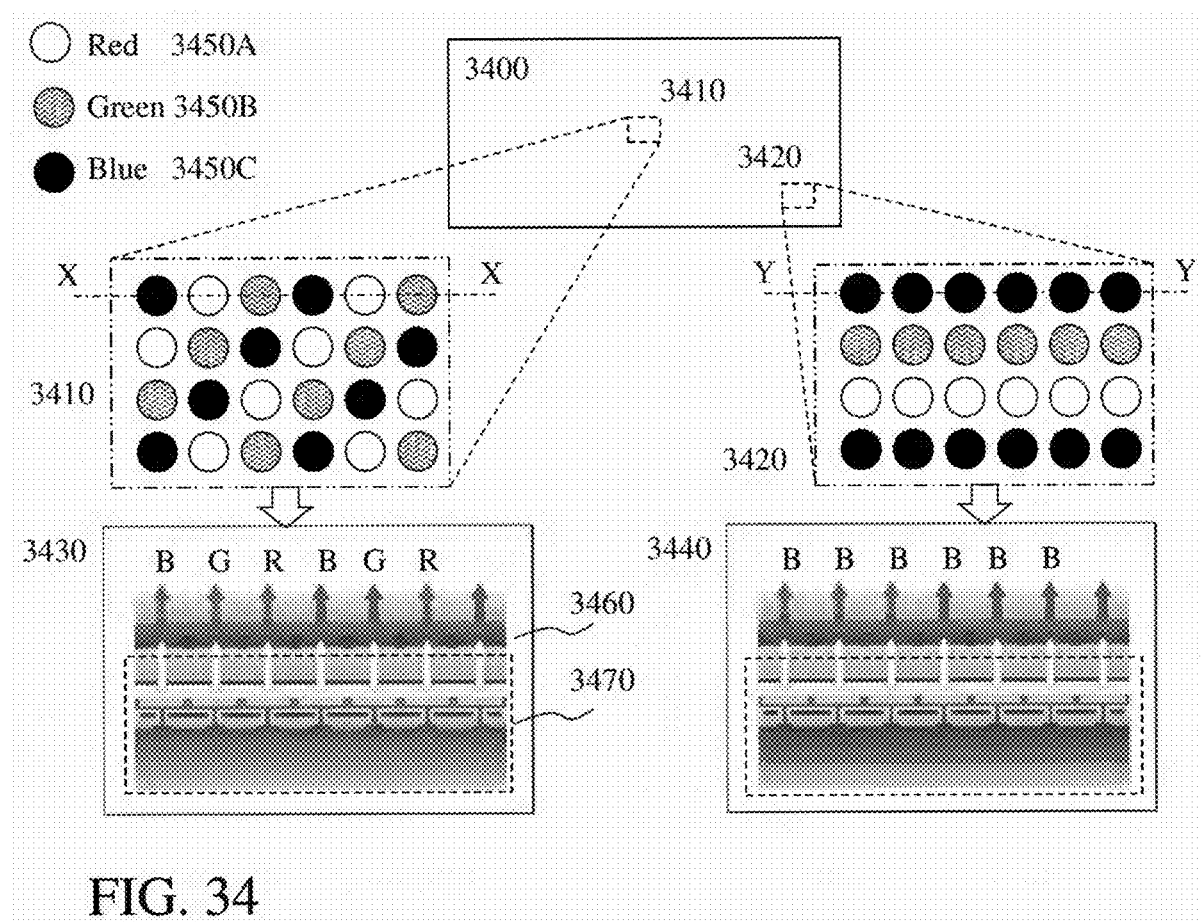
FIG. 34 depicts a hardware based approach to correct the chromatic dispersion versus position within the user's field of view for an image displayed with the lens according to FIG. 10.

As the Sony EXC331A is a display employing a colour filter layer disposed atop a white organic electroluminescent layer an alternate design methodology may be employed wherein the colour filter layer is adapted to address the CHRODISMAP of the prism such that no processing of the image for this chromatic dispersion is required. Such an embodiment of the invention is depicted in FIG. 34 wherein a display 3400 comprises Red 3450A, Green 3450B, and Blue 3450C emitters. Accordingly, first and second regions 3410 and 3420 respectively of the display are shown wherein the pixel sequence across row X-X in first region 3410 is BRGBRG but across row Y-Y in second region 3420 it is BBBBBB. Accordingly, referring to first and second sections 3430 and 3440 the display 3400 is depicted as comprising an organic white luminescent array 3470 above which is disposed a filter 3460 comprising the defined filter sequence of Red, Green, Blue for each pixel within the organic white luminescent array 3470. Accordingly, in first section 3430 the filters are sequenced in the desired BRGBRG sequence for first region 3410 whilst within the second section 3440 the filters are sequenced BBBBBB as required for second region 3420.

10. Variants

Within the preceding description in respect of FIGS. 5 to 25 respectively image processing and display—acquisition have been primarily described and depicted with respect to treating the acquired image, an acquiring sensor, display and the image's presentation as a single object. In contrast the preceding description in respect of FIGS. 26 to 34 considers an acquired image, an acquiring sensor, display and the image s presentation as multiple objects. It would be evident to one of skill in the art that the methodologies/concepts are not mutually exclusive.

For example, the optical aberrations/chromatic distortion within a central region of a displayed image may be sufficiently low that no processing is required whereas the periphery displayed image requires processing. Accordingly, the acquired image data from a CCD sensor may be split such that the GPU-CPU-OpenGL methodology described supra is only applied to the peripheral data thereby reducing processing complexity and latency. Similarly, a received image may have been pre-processed to a multiple file format for processing.

Optionally, the stored image data files may contain additional information relating to the acquiring image sensor such as its CRA etc. allowing the images to be processed in a similar manner as those acquired from a sensor associated with the user's HMD directly.

Whilst the embodiments of the invention have been presented with respect to freeform prisms for use within a head mounted display it would be evident that the principles described with respect to embodiments of the invention may be applied more generally to other near-to-eye optical systems to correct/reduce chromatic dispersion and distortion arising from the optical system.

Whilst the embodiments of the invention have been presented with respect to freeform prisms it would also be evident that chromatic dispersion and distortion may be presented within the image acquisition system as the correspondingly similar tradeoffs of cost, weight, size etc. make tradeoffs. The image acquisition dispersion/distortion map may be combined with the display optical dispersion/distortion map through a pre-processing stage and employed permanently or as required. For example, if the user with a HMD acquires image data through a video system forming part of the HMD then the combination may be applied but if the data source is, for example, Internet accessed web content then the image acquisition distortion/dispersion may not form part of the processing.

It would be evident that the embodiments of the invention may be applied to HMD systems for those with normal sight, damaged vision, and/or low vision.

Within embodiments of the invention there may exist a requirement to digitally correct for shape of the user's eyeball or retinal problems. Accordingly, the methods and processes described above may be extended to include an "eyeball map". In some embodiments of the invention this may be derived from the user's prescription of refractive corrective lenses, e.g. the spherical and cylindrical corrections for each eye. In this manner the user's prescription can be pre-processed to create a detailed "eyeball" map. In practice, such a concept would generally require that the user's eyeball was pointed at the center of the display and hence the "eyeball" map may be transformed (perhaps simply translated) based upon eye orientation data which may, for example, be derived from optically (or another means) tracking the user's eyeball(s). Accordingly, such a combination may remove the requirement for a user with refractive corrective lenses (ophthalmic lens(es)) to wear these in combination with the HMD. In instances where laser eye correction has been applied then residual visual distortion may be similarly removed.

As discussed supra processing of the optical image may in addition to the correction of dispersion/distortion address visual defects of the user, such as colour blindness and make appropriate corrections. However, it would also be evident that the inventive systems and methods may also employ other "corrections" within the digital processing domain such as filtering out certain frequencies of light, for example. Such corrections may include those to enhance the image for users with vision defects or low-vision. Another correction may be a digitally applied "blue light" filtering to reduce eye fatigue. Accordingly, the maps may include an additional wavelength mapping that may, for example, include an input table that lists frequencies and percentage filtering to be applied. Such a table may be pre-processed to convert it to a range of R, G, B values (or conditions) where the filter applies. When traversing a pixel during the digital processing this table would be referenced to determine if the filter applies. If it does apply, then the percentage filtering is applied to the RGB values of the given pixel. Optionally, filtering may be the re-calculation of new RGB values for the new spectral profile or alternatively the system may simply preserve the ratios of R, G, and B and down grade the overall intensity. It would also be evident that the process may be applied to "reverse filter" or boost certain wavelength/frequency regions. For example, for a user with only G photoreceptors it may be beneficial to boost G frequencies and reduce R and B.

The embodiments of the invention described supra may be employed in combination with other image modifications that may be performed on the display image to improve the visual function of the person wearing the HMD. These include, but are not limited to spectrally, spatially, partial spatial, temporally, differentially to specific objects and differentially to objects having particular characteristics.

In some patients there are no impairments to the eye physically but there are defects in the optical nerve or the visual cortex. It would be evident that where such damage results in incomplete image transfer to the brain, despite there being no retinal damage for example, that manipulation of the retinal image to compensate or address such damaged portions of the optical nerve and/or visual cortex is possible using a HMD according to embodiments of the invention.

Likewise damage to the occipitotemporal areas of the brain can lead to patients having issues affecting the processing of shape and colour which makes perceiving and identifying objects difficult. Similarly, damage to the dorsal pathway leading to the parietal lobe may increase patient difficulties in position and spatial relationships. The most frequent causes of such brain injuries have been found to be strokes, trauma, and tumors. Accordingly, in addition to the techniques discussed above in respect of processing edges of objects, employing spatial-spectral-temporal shifts of image data on the retina the HMD may be utilised to adjust in real-time the image displayed to the user to provide partial or complete compensation. Neuro-ophthalmological uses of a HMD according to embodiments of the invention may therefore provide compensation of optical neuropathies including for example Graves' ophthalmopathy, optic neuritis, esotropia, benign and malignant orbital tumors and nerve palsy, brain tumors, neuro-degenerative processes, strokes, demyelinating disease and muscle weakness conditions such as myasthenia gravis which affects the nerve-muscle junction.

It would be evident to one skilled in the art that such compensations may include colour shifts and/or spatially adapted images which in many instances are addressed through a series of predetermined image transformations. This arises as unlike other visual defects such as macular degeneration for example, an ophthalmological examination cannot be performed to visually identify and quantify damage. Rather based upon the patient's particular visual perception disorder other effects may be utilized. In some instances, these may exploit the high visual dynamic range of regions of the retina with rods as depicted in FIG. 1C, the spectral spatial variations across the retina as described above in respect of FIG. 1D, or the spectral sensitivity differences between different cones within the same region of the retina for example. In other embodiments elements of the image may be selectively modified to address particular processing defects such that for example an inability to determine a particular shape results in the HMD adjusting those shapes within any image that contains them.

According to embodiments of the invention the HMD may use hardware components including image sensors, lenses, prisms and other optical components, and video displays, that mimic the inherent performance of human vision in terms of visual and cognitive spatial acuity, visual and cognitive spectral response or sensitivity to color and contrast, and visual and cognitive temporal response or sensitivity to difference in visual information from one moment in time to the next. Examples of this biomimicry could include components that have higher resolution and better color representation in the center of the field of view, and relaxed resolution and color representation, but faster refresh performance at the extremities of the field of view, thereby mimicking the natural performance characteristics of human vision.

A further embodiment of the invention could also include image file formats that are well-suited for the aforementioned biomimicing physical components. For example, a file format that does not presuppose a constant pixel size or color depth can be envisioned, wherein the resolution is much higher and color depth much greater in the center of the image than at the extremities, but the frame rate is faster at the extremities.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alpha-numeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A head-mounted display device comprising:
a micro-display;
a prism lens; and
a processor coupled to the micro-display and executing an image-processing pipeline upon source images to be rendered on the micro-display; wherein
light emitted from the micro-display is received by the prism lens and subsequently performs two internal reflections before leaving the prism lens for viewing by a user of the head mounted display device, and
the prism lens comprises three free-form surfaces, which surfaces have been optimized in design for a modulation transfer-function performance specification at the expense of at least one of increased chromatic aberration and increased image distortion, and
pre-compensation of the at least one of chromatic aberration and image distortion of the prism lens is performed within the image-processing pipeline.

2. The device according to claim 1, wherein
the image processing pipeline comprises at least one of a vertex shader and a fragment shader.

3. The device according to claim 2, wherein
separate vertex buffers are defined within the vertex shader for each of the micro-display's primary display colours, each vertex buffer defining a tessellation of a non-rectangular two-dimensional bounded surface, which bounded surfaces when projected from the micro-display and subject to the at least one of chromatic aberration and image distortion of the optical train correspond and align to the user's rectangular field of view.

4. The device according to claim 1, wherein
the source images are bound to texture objects for processing by the image-processing pipeline.

5. The device according to claim 1, wherein
the source images are acquired from a camera which operates at a first frame rate;
the image processing pipeline operates at a plurality of second frame rates;
the micro-display operates at a third frame rate; and
a second frame rate of the plurality of second frame rates exceeds at least one of the first frame rate and the third frame rate.

6. The device according to claim 1, wherein
the source images are acquired from a camera at a first frame rate with a first frame size;
the image processing pipeline operates at a second frame with a second frame size;
the micro-display has a third frame rate and a third frame size;
a first horizontal dimension of the first frame size is greater than or equal to a second horizontal dimension of the second frame size and a first vertical dimension of the first frame size is greater than or equal to a second vertical dimension of the second frame size; and
the second horizontal dimension of the second frame size is greater than or equal to a third horizontal dimension of the third frame size and the second vertical dimension of the second frame size is greater than or equal to a third vertical dimension of the third frame size.

7. The device according to claim 6, wherein
the processed source images are rendered on the micro-display by shifting an origin of the processed source images with respect to the origin of the images acquired from the camera substantially in real time so as to compensate for motion of the camera.

8. The device according to claim 1, wherein
a first horizontal dimension of the processed source images is less than a second horizontal dimension of the source images, and a first vertical dimension of the processed source images is less than a second vertical dimension of the source images; and
each processed source image is derived from a centrally-located rectangular region within its respective source image.

9. The device according to claim 1, wherein
the image processing pipeline comprises:
storing each source image within a first buffer which stores data according to a first colour space;
determining whether source image is to be rendered with additional processing;
upon a negative determination processing the source image with a first subset of the image processing pipeline to apply the pre-compensation of the at least one of chromatic aberration and image distortion to the source image prior to it being rendered on the micro-display; and upon a positive determination processing the source image with a second subset of the image processing pipeline prior to applying the first subset of the image processing pipeline applying pre-compensation of the at least one of chromatic aberration and image distortion to the source image prior to it being rendered on the micro-display;

wherein the second sub-set of the image processing pipeline comprises:

converting the first buffer to a second buffer, wherein the data within the second buffer is stored according to a second colour space;

executing a first process upon the second buffer to compute an overall source image histogram; and converting the second buffer to a third buffer where the data within the third buffer is stored according to the first colour space and is generated in dependence upon applying a conversion process to the second buffer in dependence upon at least the source image histogram;

a first portion of the second sub-set of the image processing pipeline is processed by tessellating the second buffer for parallel processing within a graphics processing unit forming part of the processor; and a second portion of the second sub-set of the image processing pipeline is processed by a central processing unit forming part of the device.

10. The device according to claim 1, wherein
the source images are acquired from an image sensor; and
the source images are processed by either the image sensor or the processor to correct for at least one of distortions and chromatic aberrations of the image sensor.

11. The device according to claim 1, wherein
the image processing pipeline processes each source image as a plurality of elements;
a subset of the plurality of elements are processed and provided to the micro-display asynchronously to other elements of the plurality of elements; and
the subset of the plurality of elements are one of:
associated with a portion of the source images established by processing the source images and determining an object is moving within that portion of the source image
associated with black and white image content whilst the other elements of the plurality of elements are associated with colour regions of the source images;
associated with pixels within the micro-display of a predetermined colour.

12. A head-mounted display device comprising:
a micro-display;
an optical train coupling light emitted from the micro-display to a user's eye, the optical train inducing at least one of chromatic aberration and image distortion; and
a processor coupled to the micro-display and executing an image-processing pipeline upon source images to be rendered on the micro-display; wherein
the image-processing pipeline comprises at least a vertex shader, and
separate vertex buffers are defined within the vertex shader for each of the micro-display's primary display colours, each vertex buffer defining a tessellation of a non-rectangular two-dimensional bounded surface, which bounded surfaces when projected from the micro-display and subject to the at least one of chromatic aberration and image distortion of the optical train correspond and align to the user's rectangular field of view.

13. The device according to claim 12, wherein
the optical train comprises a prism lens.

14. The device according to claim 12, wherein
the optical train comprises a prism lens designed to exceed a modulation transfer function performance specification without minimizing at least one of image distortion and chromatic aberration.

15. The device according to claim 14, wherein
the modulation transfer function performance specification at a centre of a user's eyebox exceeds that at the edges of the user's eyebox.

16. The device according to claim 12, wherein
the source images are acquired from a camera which operates at a first frame rate;
the image processing pipeline operates at a plurality of second frame rates;
the micro display operates at a third frame rate; and
a second frame rate of the plurality of second frame rates exceeds at least one of the first frame rate and the third frame rate.

17. The device according to claim 12, wherein
the source images are acquired from a camera at a first frame rate with a first frame size;
the image processing pipeline operates at a second frame rate with a second frame size;
the micro-display operates at a third frame rate with a third frame size;
a first horizontal dimension of the first frame size is greater than or equal to a second horizontal dimension of the second frame size and a first vertical dimension of the first frame size is greater than or equal to a second vertical dimension of the second frame size; and
the second horizontal dimension of the second frame size is greater than or equal to a third horizontal dimension of the third frame size and the second vertical dimension of the second frame size is greater than or equal to a third vertical dimension of the third frame size.

18. The device according to claim 12, wherein
the processed source images are rendered on the micro-display by shifting an origin of the processed source images with respect to the origin of the sourced images acquired from a camera in substantially real time so as to compensate for motion of the camera; wherein
the processed source image has a first horizontal dimension less than a second horizontal dimension of the acquired source image and a first vertical dimension less than a second vertical dimension of the acquired source image.

19. The device according to claim 12, wherein
a first horizontal dimension and a first vertical dimension of the processed source images is less than a second horizontal dimension and a second vertical dimension of the source images; and
each processed source image is derived from a centrally located rectangular region within its respective source image.

20. The device according to claim 12, wherein
the image processing pipeline comprises:
storing each source image within a first buffer which stores data according to a first colour space;
determining whether source image is to be rendered with additional processing;
upon a negative determination processing the source image with a first subset of the image processing pipeline to apply the pre-compensation of the at least one of chromatic aberration and image distortion to the source image prior to it being rendered on the micro-display; and upon a positive determination processing the source image with a second subset of the image processing pipeline prior to apply the first subset of the image processing pipeline to apply the pre-compensation of the at least one of chromatic aberration and image distortion to the source image prior to it being rendered on the micro-display; wherein the second sub-set of the image processing pipeline comprises:
converting the first buffer to a second buffer, wherein the data within the second buffer is stored according to a second colour space;
executing a first process upon the second buffer to compute an overall source image histogram; and
converting the second buffer to a third buffer where the data within the third buffer is stored according to the first colour space and is generated in dependence upon applying a conversion process to the second buffer in dependence upon at least the source image histogram;

a first portion of the second sub-set of the image processing pipeline is processed by tessellating the second buffer for parallel processing within a graphics processing unit forming part of the processor; and a second portion of the second sub-set of the image processing people is processed by a central processing unit forming part of the device.

21. The device according to claim 12, wherein
the source images are acquired from an image sensor; and
the source images are processed by either the image sensor or the processor to correct for at least one of distortions and chromatic aberrations of the image sensor.

22. The device according to claim 12, wherein
the image processing pipeline processes each source image as a plurality of elements;
a subset of the plurality of elements are processed and provided to the micro-display asynchronously to other elements of the plurality of elements; and
the subset of the plurality of elements are one of:
associated with a portion of the source images established by processing the source images and determining an object is moving within that portion of the source image
associated with black and white image content whilst the other elements of the plurality of elements are associated with colour regions of the source images;
associated with pixels within the micro-display of a predetermined colour.

* * * * *